(12) United States Patent
Tsukahara et al.

(10) Patent No.: US 9,010,288 B2
(45) Date of Patent: Apr. 21, 2015

(54) SIX-STROKE ENGINE

(75) Inventors: Ei Tsukahara, Shizuoka (JP); Takurou Kamichika, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/129,568

(22) PCT Filed: Jul. 2, 2012

(86) PCT No.: PCT/JP2012/066919
§ 371 (c)(1),
(2), (4) Date: Feb. 26, 2014

(87) PCT Pub. No.: WO2013/002411
PCT Pub. Date: Jan. 3, 2013

(65) Prior Publication Data
US 2014/0224195 A1     Aug. 14, 2014

(30) Foreign Application Priority Data
Jun. 30, 2011   (JP) .................................. 2011-145518

(51) Int. Cl.
*F02B 75/02* (2006.01)
*F02B 23/10* (2006.01)
(Continued)

(52) U.S. Cl.
CPC ............ *F02B 75/021* (2013.01); *F02B 23/101* (2013.01); *F02B 23/104* (2013.01); *F02M 63/00* (2013.01); *F02B 29/0406* (2013.01); *F01L 13/00* (2013.01); *F02B 75/02* (2013.01);
(Continued)

(58) Field of Classification Search
CPC ... F02B 75/021; F02B 2075/125; F02B 75/02
USPC ................... 123/64, 406.11, 146.5 R, 406.26
See application file for complete search history.

(56) References Cited

U.S. PATENT DOCUMENTS 6,443,108 B1 *   9/2002   Brehob et al. ................... 123/64
8,141,541 B2 *   3/2012   Aso et al. ....................... 123/436
(Continued)

FOREIGN PATENT DOCUMENTS

GB        2 057 052 A     3/1981
JP        62-003118 A     1/1987
(Continued)

OTHER PUBLICATIONS

Official Communication issued in International Patent Application No. PCT/JP2012/066919, mailed on Jul. 24, 2012.
(Continued)

*Primary Examiner* — Noah Kamen
*Assistant Examiner* — Long T Tran
(74) *Attorney, Agent, or Firm* — Keating & Bennett, LLP

(57) ABSTRACT

A six-stroke engine includes a cylinder, a piston, a cylinder head, a combustion chamber, cylinder injector, a spark plug, an intake port, an exhaust port, an intake valve, an exhaust valve, a valve gear, and a control device. The valve gear operates the intake valve and the exhaust valve to execute six strokes including an intake stroke, a compression stroke without ignition, an expansion stroke without combustion, a compression stroke with ignition, an expansion stroke with combustion, and an exhaust stroke in this order. The control device is programmed to cause the cylinder injector to inject fuel and to energize the spark plug in the compression stroke with ignition.

11 Claims, 20 Drawing Sheets

(51) Int. Cl.
| | |
|---|---|
| *F02M 63/00* | (2006.01) |
| *F01L 13/00* | (2006.01) |
| *F02D 13/02* | (2006.01) |
| *F02D 41/30* | (2006.01) |
| *F02D 37/02* | (2006.01) |
| *F02D 39/04* | (2006.01) |
| *F02B 37/24* | (2006.01) |
| *F02B 29/04* | (2006.01) |
| *F02B 75/12* | (2006.01) |
| *F02D 41/40* | (2006.01) |
| *F02D 41/38* | (2006.01) |
| *F02D 41/18* | (2006.01) |
| *F02P 5/04* | (2006.01) |
| *F02D 41/00* | (2006.01) |

(52) U.S. Cl.
CPC .......... *F02D 13/02* (2013.01); *F02D 13/0215* (2013.01); *F02B 2023/106* (2013.01); *F02B 2075/125* (2013.01); *F02B 2275/16* (2013.01); *F01L 13/0026* (2013.01); *F01L 13/0063* (2013.01); *Y02T 10/18* (2013.01); *Y02T 10/125* (2013.01); *Y02T 10/123* (2013.01); *F02D 41/402* (2013.01); *F02D 2041/389* (2013.01); *F02D 41/18* (2013.01); *F02D 41/3017* (2013.01); *F02D 41/3064* (2013.01); *F02D 41/3094* (2013.01); *F02P 5/045* (2013.01); *F02D 37/02* (2013.01); *F02D 39/04* (2013.01); *F02D 2041/001* (2013.01); *F02D 2200/101* (2013.01); *F02B 37/24* (2013.01)

(56) References Cited

U.S. PATENT DOCUMENTS

| | | | |
|---|---|---|---|
| 2009/0277403 | A1* | 11/2009 | Hu .................................. 123/64 |
| 2010/0095913 | A1 | 4/2010 | Kelem et al. |
| 2010/0228466 | A1* | 9/2010 | Ekchian et al. ............... 701/113 |

FOREIGN PATENT DOCUMENTS

| | | |
|---|---|---|
| JP | 04-060111 A | 2/1992 |
| JP | 05-240049 A | 9/1993 |
| JP | 2001-342836 A | 12/2001 |
| JP | 2004-068707 A | 3/2004 |
| JP | 2004-100666 A | 4/2004 |
| JP | 2004-116305 A | 4/2004 |
| JP | 2010-031705 A | 2/2010 |
| JP | 2011-074873 A | 4/2011 |
| WO | 2007/129206 A1 | 11/2007 |

OTHER PUBLICATIONS

Official Communication issued in corresponding European Patent Application No. 12805117.4, mailed on Oct. 31, 2014.

* cited by examiner

SIX-STROKE ENGINE

BACKGROUND OF THE INVENTION

1. Field of the Invention

The present invention relates to a six-stroke engine including a cylinder injector that directly injects fuel into a combustion chamber.

2. Description of the Related Art

As a conventional technique of improving the fuel efficiency of an engine, there exists a so-called stratified charge combustion technique of concentrating a small amount of fuel in the vicinity of a spark plug and burning it. A conventional engine capable of performing stratified charge combustion is described in, for example, Japanese Patent Laid-Open No. 2001-342836.

To concentrate a small amount of fuel in the vicinity of the spark plug, the engine disclosed in Japanese Patent Laid-Open No. 2001-342836 uses an arrangement to generate a tumble that is a swirl flow of intake air in the cylinder. The tumble occurs when the intake air that has flowed from the intake port into the cylinder flows in the axial direction of the cylinder and reverses at the top of the piston. The intake port and the piston top of the engine described in Japanese Patent Laid-Open No. 2001-342836 are made in special shapes so as to keep the tumble even at the latter half of the compression stroke.

The intake port is arranged such that the tilt angle with respect to the axis of the cylinder becomes smaller than normal. A spherical concave portion is provided at the piston top. In this engine, the fuel is directly injected into the combustion chamber by a cylinder injector during the compression stroke. The fuel hits the intake air flowing in the tumble and stays in the vicinity of the spark plug.

As an engine capable of improving the fuel efficiency, a six-stroke engine is known. The six-stroke engine operates in one cycle of six strokes: four strokes including an intake stroke, a compression stroke, an expansion stroke, and an exhaust stroke and an additional compression stroke and expansion stroke. A conventional six-stroke engine is described in, for example, Japanese Patent Laid-Open No. 2004-116305.

The six-stroke engine disclosed in Japanese Patent Laid-Open No. 2004-116305 is operated by executing six strokes including an intake stroke, a compression stroke without ignition, an expansion stroke without combustion, a compression stroke with ignition, an expansion stroke with combustion, and an exhaust stroke in this order. In this six-stroke engine, fuel is supplied into the cylinder or intake channel in the intake stroke. In the subsequent compression stroke without ignition and expansion stroke without combustion, the fuel and intake air are stirred and mixed in the cylinder.

The intake port in Japanese Patent Laid-Open No. 2001-342836 is arranged to greatly change the direction of intake air flow to cause a tumble. In the engine described in Japanese Patent Laid-Open No. 2001-342836, the intake port, the piston top, and the fuel (spray) injected from the cylinder injector need to be made in optimum shapes. For this reason, the intake air volume is small in the engine described in Japanese Patent Laid-Open No. 2001-342836, and there is a limit on increasing the output.

The six-stroke engine described in Japanese Patent Laid-Open No. 2004-116305 cannot perform stratified charge combustion, and it is therefore difficult to further improve the fuel efficiency.

SUMMARY OF THE INVENTION

Accordingly, preferred embodiments of the present invention have been made to solve the above-described problems, and provide a six-stroke engine that realizes stratified charge combustion while increasing the intake air volume.

A preferred embodiment of the present invention includes a six-stroke engine including a cylinder; a piston inserted into the cylinder; a cylinder head attached to the cylinder; a combustion chamber surrounded by the cylinder, the piston, and the cylinder head; a cylinder injector that directly injects fuel into the combustion chamber; a spark plug attached to a wall of the combustion chamber; an intake port provided in the cylinder head and including a downstream end open to the combustion chamber; an exhaust port provided in the cylinder head and including an upstream end open to the combustion chamber; an intake valve provided in the cylinder head to open/close the intake port; an exhaust valve provided in the cylinder head to open/close the exhaust port; a valve mechanism, also referred to a valve gear, that operates the intake valve and exhaust valve to execute six strokes including an intake stroke, a compression stroke without ignition, an expansion stroke without combustion, a compression stroke with ignition, an expansion stroke with combustion, and an exhaust stroke in this order; and a control device programmed to cause the cylinder injector to inject the fuel and to energize the spark plug during the compression stroke with ignition.

Another preferred embodiment of the present invention provides a method of operating a six-stroke engine including a cylinder; a piston inserted into the cylinder; a cylinder head attached to the cylinder; a combustion chamber surrounded by the cylinder, the piston, and the cylinder head; a cylinder injector that directly injects fuel into the combustion chamber; a spark plug attached to a wall of the combustion chamber; an intake port provided in the cylinder head and including a downstream end open to the combustion chamber; an exhaust port provided in the cylinder head and including an upstream end open to the combustion chamber; an intake valve provided in the cylinder head to open/close the intake port; and an exhaust valve provided in the cylinder head to open/close the exhaust port; the method including the steps of causing the engine to execute six strokes including an intake stroke, a compression stroke without ignition, an expansion stroke without combustion, a compression stroke with ignition, an expansion stroke with combustion, and an exhaust stroke in this order, and causing the cylinder injector to inject the fuel and to energize the spark plug during the compression stroke with ignition.

In a preferred embodiment of the present invention, air supplied into the cylinder in the intake stroke is compressed in the compression stroke without ignition and expanded in the following expansion stroke without combustion. When the intake air is compressed/expanded in this manner, the flow of the intake air attenuates and becomes remarkably small in the cylinder. The fuel is directly injected by the cylinder injector into the cylinder in which the intake air almost stands still.

For this reason, according to a preferred embodiment of the present invention, it is possible to accurately supply, in the vicinity of the spark plug, the fuel in an amount suitable for stratified charge combustion without using a swirl flow of intake air.

In addition, since the intake air need not be swirled, the intake port of the six-stroke engine according to a preferred embodiment of the present invention is free from the constraints that are necessary to generate a swirl flow. It is therefore possible to provide an intake port in such a shape that reduces the intake resistance and obtain a so-called high flow rate port.

Hence, according to preferred embodiments of the present invention, stratified charge combustion is realized in the six-stroke engine while increasing the intake air volume. This six-stroke engine improves the output because the intake air volume increases. In addition, since stratified charge combustion is realized, the fuel efficiency is improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A six-stroke engine according to the first preferred embodiment of the present invention will now be described in detail with reference to FIGS. 1 to 7, including modifications thereof.

Figure 1:
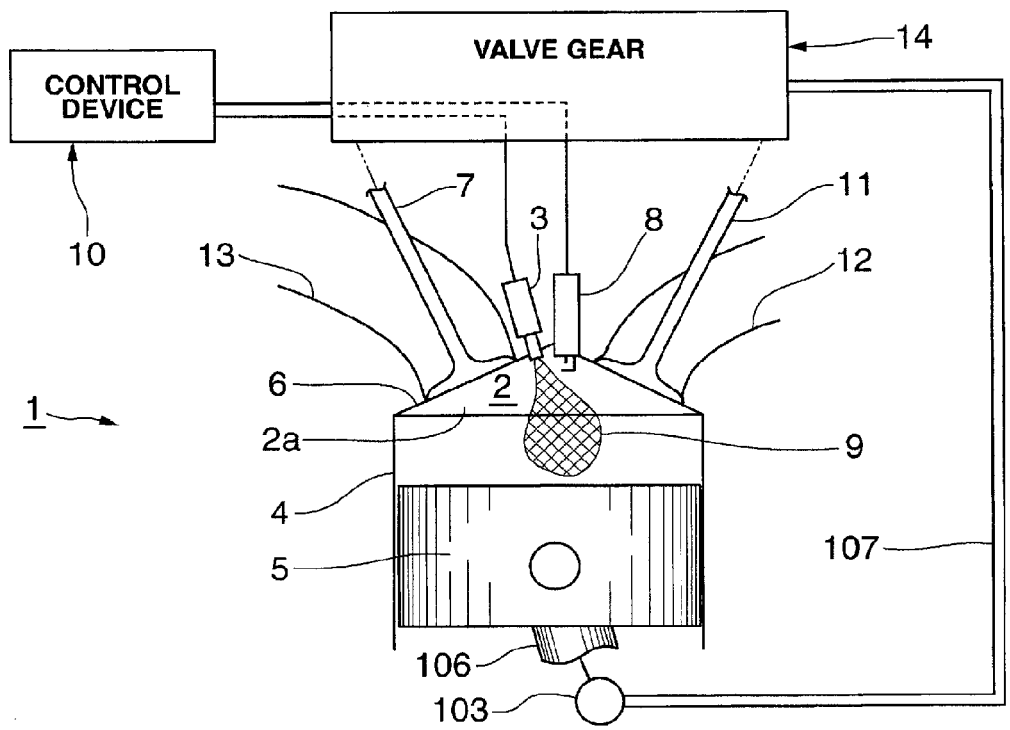
FIG. 1 is a sectional view showing the arrangement of the main portion of a six-stroke engine according to a first preferred embodiment of the present invention.

A six-stroke engine 1 shown in FIG. 1 includes a cylinder injector 3 that directly injects fuel (for example, gasoline) into a combustion chamber 2. Note that the six-stroke engine 1 can be constituted as a single cylinder engine or a multiple cylinder engine. The six-stroke engine 1 can also be constituted as a serial multiple cylinder engine or a V-type engine.

The combustion chamber 2 is surrounded by a cylinder 4, a piston 5, and a cylinder head 6. The cylinder 4 and the cylinder head 6 are cooled by a water cooling device (not shown). The cylinder injector 3 shown in FIG. 1 is attached to a ceiling wall 2a of the combustion chamber 2 at a portion between an intake valve 7 and a spark plug 8. The cylinder injector 3 injects fuel 9 such that it reaches the vicinity of the spark plug 8. In the six-stroke engine 1 according to the present preferred embodiment, the fuel 9 is preferably injected such that it is retained only in the vicinity of the spark plug 8.

The timing of causing the cylinder injector 3 to inject the fuel 9 is controlled by an injector control unit 10a (see FIG. 7) of an engine control device 10. That is, the control device 10 is programmed to cause the cylinder injector 3 to inject the fuel at a predetermined injection timing. A load detection sensor 100 configured to detect load, a throttle position sensor 101 configured to detect the degree of opening of a throttle valve (not shown), an engine rotation speed sensor 102 configured to detect the rotation speed of the engine, a crank position sensor 104 configured to detect the rotation angle of a crankshaft 103 (see FIG. 1), a cam position sensor 105, and the like are connected to the control device 10. Any type of sensor such as an air flow meter is usable as the load detection sensor 100 as long as it can detect the intake air volume.

The throttle valve is used to control the flow rate of intake air supplied into the combustion chamber 2. Note that to control the flow rate of intake air, not the throttle valve but a variable valve gear mechanism having the same function as the throttle valve may be used. The variable valve gear mechanism can freely change the lift amount and opening/closing timing of the intake valve 7. The engine rotation speed sensor 102 can be a sensor that detects the rotation speed of the engine using the rotation angle of the crankshaft 103 (see FIG. 1), the number of times of energizing the spark plug 8, or the like. The crankshaft 103 is connected to the piston 5 via a connecting rod 106, as shown in FIG. 1.

Figure 7:
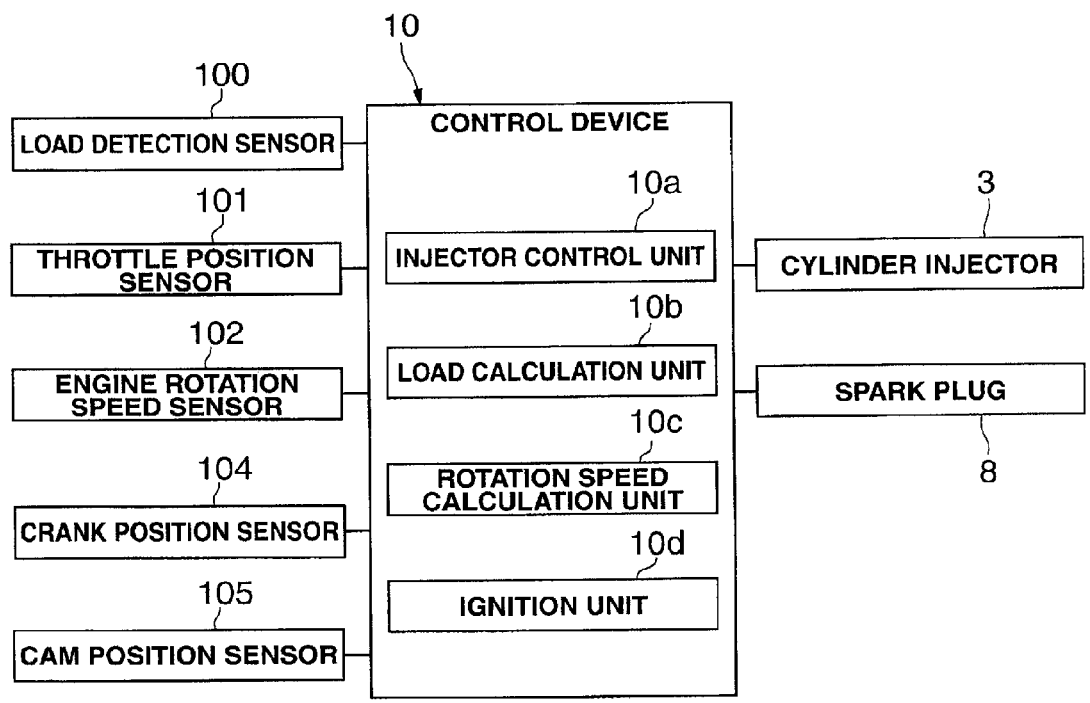
FIG. 7 is a block diagram showing the arrangement of a control device according to the first preferred embodiment of the present invention.

As shown in FIG. 7, the control device 10 according to the present preferred embodiment includes the injector control unit 10a, a load calculation unit 10b, a rotation speed calculation unit 10c, and an ignition unit 10d. The load calculation unit 10b obtains the intake air volume by calculation based on the detection value of the load detection sensor 100. The rotation speed calculation unit 10c obtains the rotation speed of the engine based on the detection value of the engine rotation speed sensor 102. The ignition unit 10d energizes the spark plug 8 at a predetermined ignition timing.

The injection amount of the fuel 9 is set such that a fuel-air mixture in which air and the fuel 9 are mixed at a combustible mixing ratio is generated in the vicinity of the spark plug 8. The mixing ratio is set by the injector control unit 10a based on the intake air volume obtained by the load calculation unit 10b, the engine rotation speed obtained by the rotation speed calculation unit 10c, or the like.

That is, the six-stroke engine 1 is configured to realize stratified charge combustion and enable ultra-lean burn. Any type of injector is usable as the cylinder injector 3 as long as it can inject the fuel 9 into the combustion chamber 2. As the cylinder injector 3, for example, an outward lifting valve injector, a multi-hole injector, a swirl injector, a single-hole injector, a slit injector, or the like is usable.

An exhaust valve 11 opens/closes an exhaust port 12. The intake valve 7 opens/closes an intake port 13. The intake valve 7 and the exhaust valve 11 are driven by a valve gear 14 to be described below. The intake port 13 is a so-called high flow rate port such that the intake air volume becomes as large as possible. That is, the intake port 13 does not have a shape that generates a tumble in the cylinder 4 but a shape that has a resistance to the intake air flow that is as small as possible.

The spark plug 8 preferably is provided at a center or approximate center of the ceiling wall 2a with a circular or substantially circular shape when viewed from the axial direction of the cylinder 4. The ignition timing of the spark plug 8 is controlled by the ignition unit 10d of the control device 10.

The six-stroke engine 1 according to the first preferred embodiment uses these unique features in an operation method of the six-stroke engine 1. This operation method is performed using the valve gear 14, the cylinder injector 3, and the control device 10.

Figure 3:
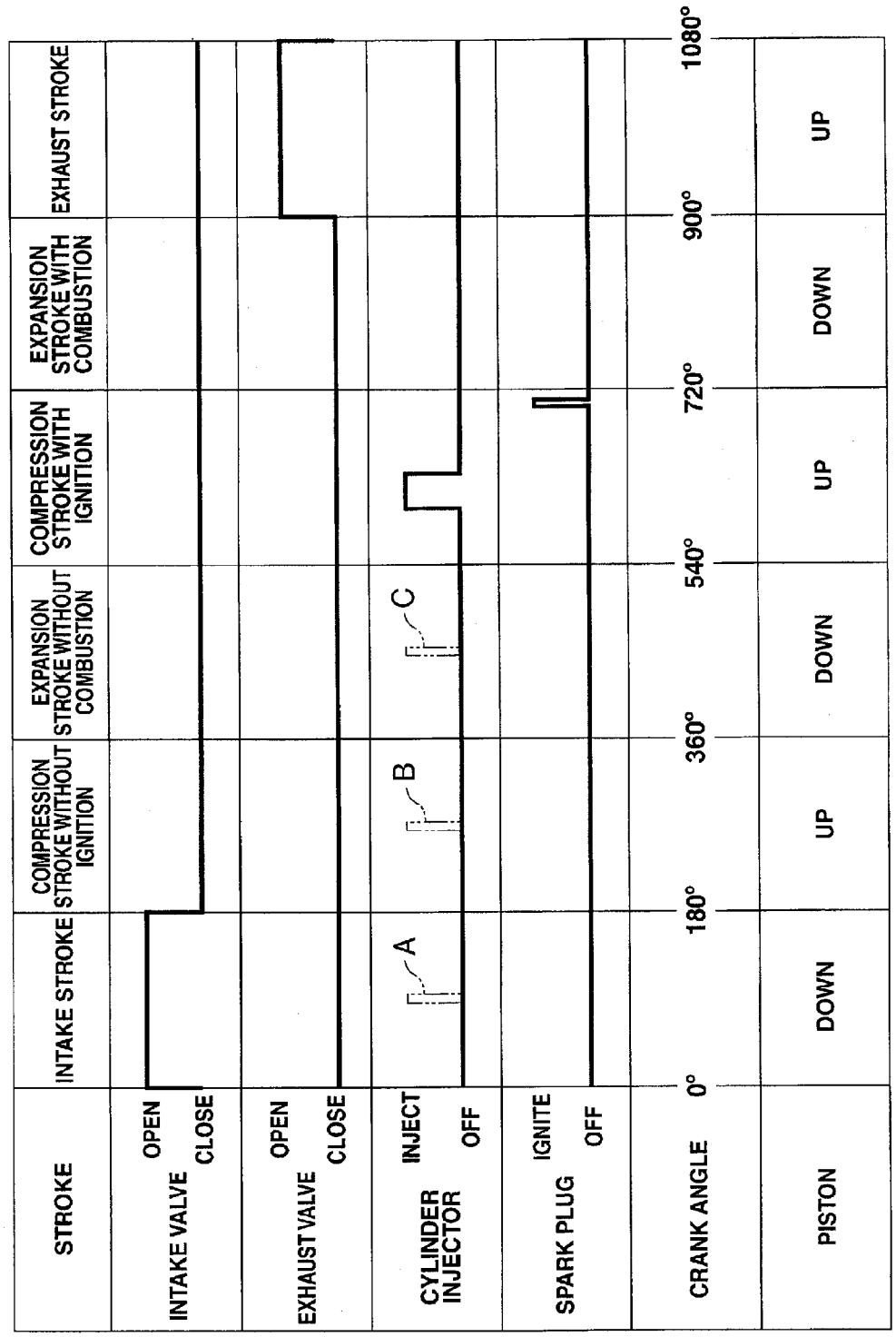
FIG. 3 is a timing chart for explaining a stroke execution pattern according to the first preferred embodiment of the present invention.

As shown in FIG. 3, the valve gear 14 is configured to execute six strokes. The six strokes include an intake stroke, a compression stroke without ignition, an expansion stroke without combustion, a compression stroke with ignition, an expansion stroke with combustion, and an exhaust stroke.

The valve gear 14 actuates the intake valve 7 and the exhaust valve 11 such that the six strokes are executed in the above-described order. In the intake stroke, the piston 5 moves from the top dead center to the bottom dead center in a state in which the intake valve 7 is open, and the exhaust valve 11 is closed, and new air is supplied into the cylinder 4. Note that the movement of the piston 5 from the top dead center to the bottom dead center will simply be referred to as "the piston 5 lowers", and the movement of the piston 5 from the bottom dead center to the top dead center will simply be referred to as "the piston 5 rises" hereinafter.

In the compression stroke without ignition, the piston 5 rises in a state in which the intake valve 7 and the exhaust valve 11 are closed, and the air in the cylinder 4 is compressed.

In the expansion stroke without combustion, the piston 5 lowers in a state in which the intake valve 7 and the exhaust valve 11 are closed, and the compressed air is expanded and restored.

In the compression stroke with ignition, the piston 5 rises in a state in which the intake valve 7 and the exhaust valve 11 are closed, and the air in the cylinder 4 is compressed again. In the compression stroke with ignition, the cylinder injector 3 injects the fuel 9 under the control of the control device 10. The spark plug 8 is energized by the control device 10 to ignite the fuel 9 at the end of this stroke. In the above-described operation method, the fuel 9 is injected in the compression stroke with ignition after the compression stroke without ignition and the expansion stroke without combustion.

In the expansion stroke with combustion, the piston 5 lowers by a combustion pressure in a state in which the intake valve 7 and the exhaust valve 11 are closed.

In the exhaust stroke, the piston 5 rises in a state in which the exhaust valve 11 is open, and the intake valve 7 is closed, and the exhaust gas in the cylinder 4 is discharged to the exhaust port.

In the six-stroke engine 1 having the above-described arrangement, a large volume of air is supplied into the cylinder 4 in the intake stroke. This is because the intake port 13 is designed to minimize the resistance of the intake air flow.

The large volume of air (intake air) supplied into the cylinder 4 in the intake stroke flows in the cylinder 4 toward the piston 5 by inertia. The intake air is compressed in the subsequent compression stroke without ignition and expanded in the expansion stroke without combustion. When the intake air is compressed/expanded in this manner, the kinetic energy of the intake air is lost, and the flow of the intake air attenuates and becomes small in the cylinder 4.

For this reason, after the shift from the expansion stroke without combustion to the compression stroke with ignition, most intake air supposedly hardly flows in the cylinder 4. The fuel 9 is directly injected by the cylinder injector 3 into the cylinder 4 in which the intake air almost stands still. Since the intake air in the cylinder 4 hardly flows, the traveling direction of the fuel 9 in the cylinder 4 does not greatly change. The fuel 9 injected from the cylinder injector 3 to the vicinity of the spark plug 8 reaches the vicinity of the spark plug 8 without changing its traveling direction and mixes with the air.

That is, in the six-stroke engine 1 according to the present preferred embodiment, it is possible to accurately supply, to the vicinity of the spark plug 8, the fuel 9 in an amount suitable for stratified charge combustion without using a swirl flow of the intake air. The fuel-air mixture containing the fuel 9 and air injected to the vicinity of the spark plug 8 is ignited by the spark plug 8 at the end of the compression stroke with ignition.

Hence, according to the present preferred embodiment, it is possible to provide a six-stroke engine that realizes stratified charge combustion while increasing the intake air volume. The six-stroke engine 1 improves the output because the intake air volume increases. In addition, since stratified charge combustion is realized, the fuel efficiency is improved.

In the six-stroke engine 1 according to the first preferred embodiment, the factor that needs to be optimized to realize stratified charge combustion is only the spray shape of the cylinder injector 3. For this reason, there are no constraints of other factors in deciding the spray shape. Hence, the six-stroke engine 1 according to the present preferred embodiment very easily realizes stable stratified charge combustion.

In the six-stroke engine 1, the timing at which the cylinder injector 3 injects the fuel 9 is not limited to the compression stroke with ignition. That is, the cylinder injector 3 may inject the fuel 9 at least once in advance before the ignition of the fuel 9 in the compression stroke with ignition. For example, the cylinder injector 3 can use an arrangement to inject the fuel 9 in each stroke, as indicated by alternate long and two short dashed lines A to C in FIG. 3. When this arrangement is used, the fuel 9 disperses in a wide range in the cylinder 4. This causes so-called weakening of stratification and eliminates an over-concentrated region.

First Modification of First Preferred Embodiment

Figure 2:
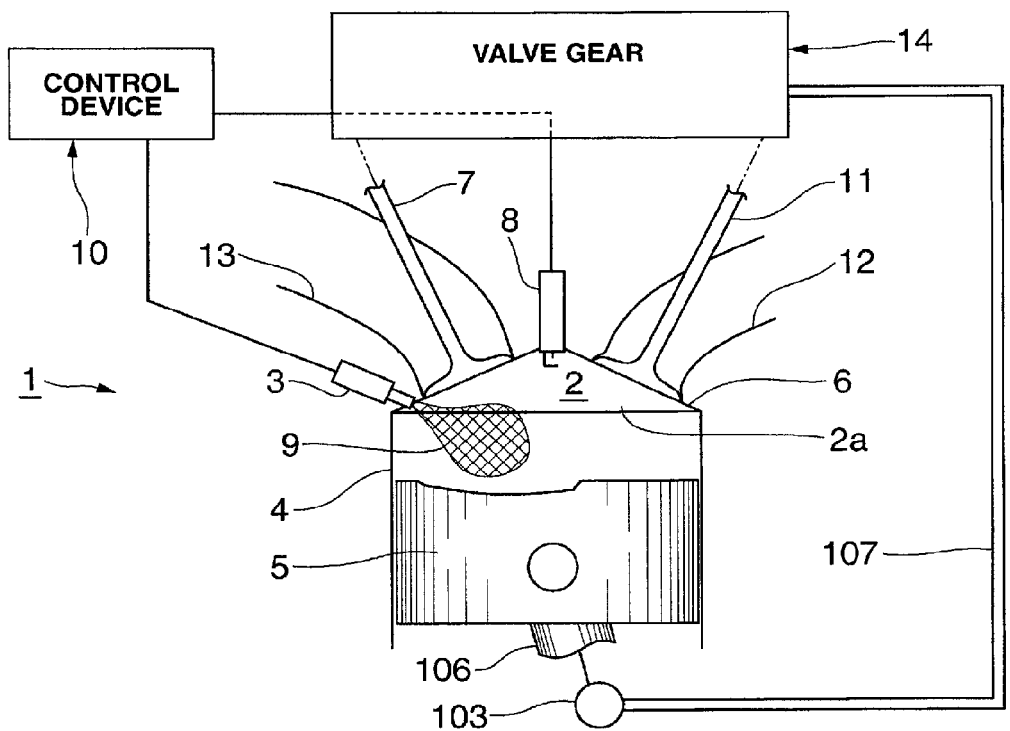
FIG. 2 is a sectional view illustrating a cylinder injector attached to a different position so as to show a first modification of the first preferred embodiment of the present invention.

The cylinder injector 3 can be attached to the peripheral portion of the ceiling wall 2a as the first modification of the first preferred embodiment shown in FIG. 2.

The same reference numerals as those described with reference to FIG. 1 denote the same or similar members in FIG. 2, and a detailed description thereof will appropriately be omitted. The cylinder injector 3 shown in FIG. 2 is located outside the intake valve 7 in the radial direction of the cylinder 4.

Second and Third Modifications of First Preferred Embodiment

Figure 4:
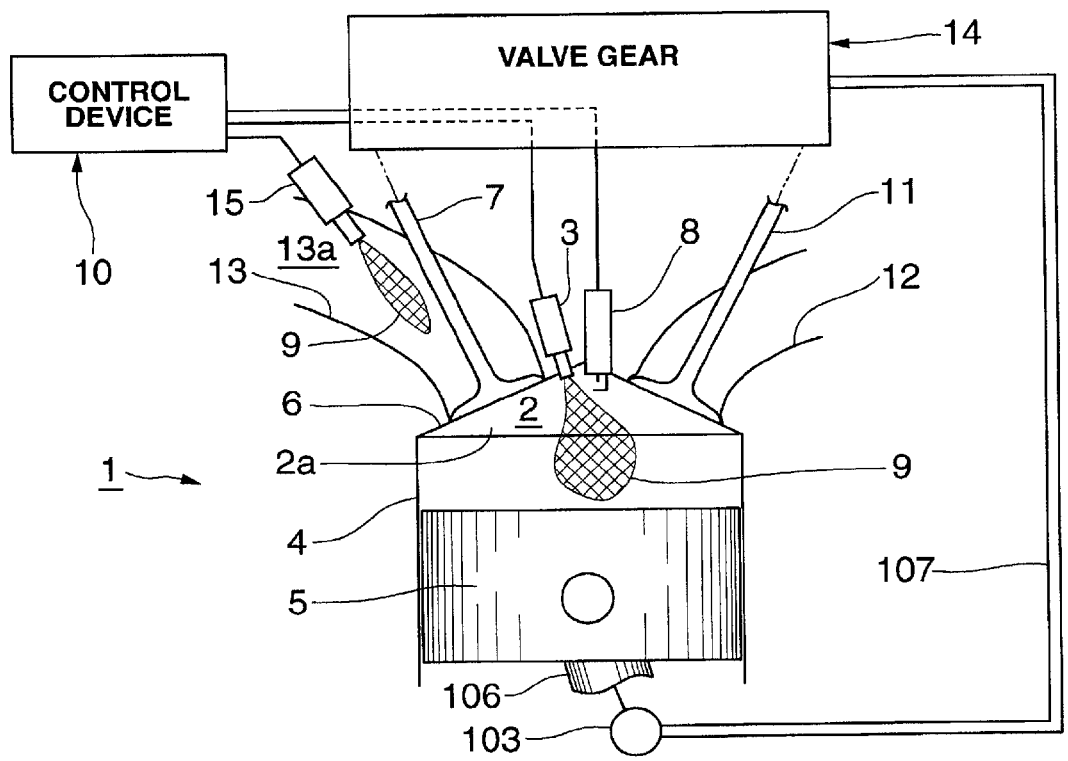
FIG. 4 is a sectional view illustrating the arrangement of the main portion of a six-stroke engine including an intake channel injector to show a second modification of the first preferred embodiment of the present invention.
Figure 5:
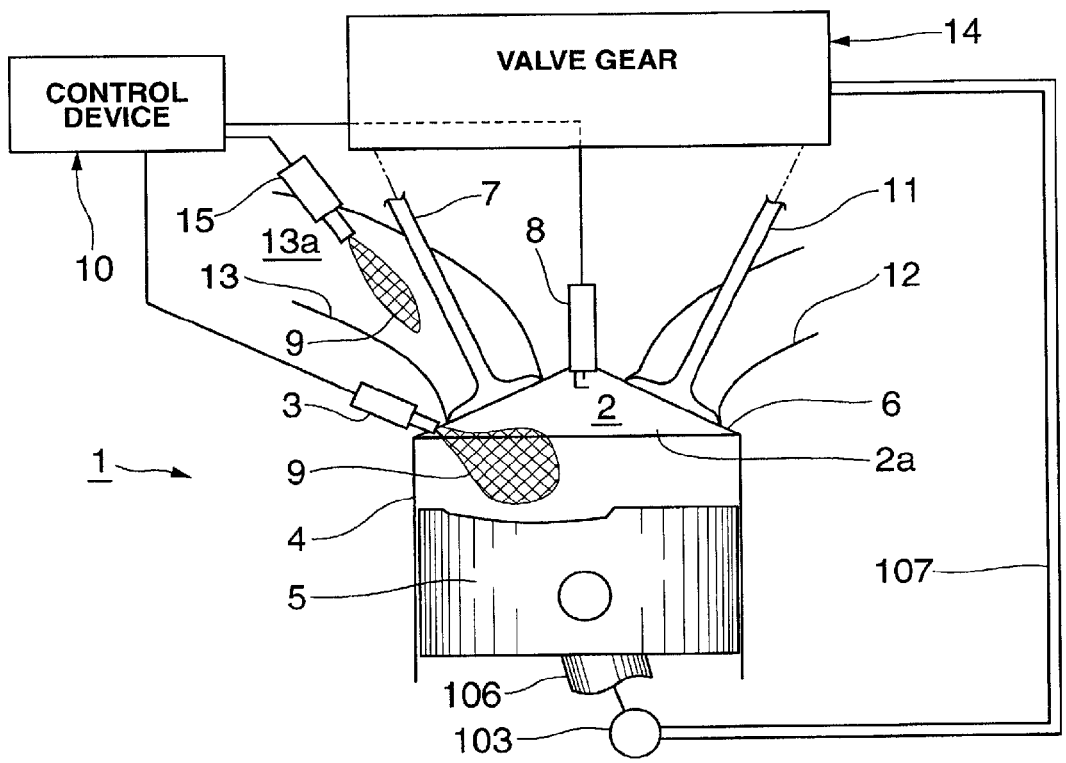
FIG. 5 is a sectional view illustrating the arrangement of the main portion of a six-stroke engine including an intake channel injector to show a third modification of the first preferred embodiment of the present invention.

The six-stroke engine 1 according to the first preferred embodiment can be equipped with an injector on the intake channel side as well, as shown in FIGS. 4 and 5 as the second and third modifications of the first preferred embodiment. The same reference numerals as those described with reference to FIGS. 1 and 2 denote the same or similar members in FIGS. 4 and 5, and a detailed description thereof will appropriately be omitted.

The cylinder head 6 shown in each of FIGS. 4 and 5 includes an intake channel injector 15 in addition to the cylinder injector 3. The intake channel injector 15 injects the fuel 9 into an intake channel 13a including the intake port 13 in the intake stroke.

According to the second and third modifications including the intake channel injector 15, the fuel-air mixture is supplied into the cylinder 4 in the intake stroke. It is therefore possible to provide a six-stroke engine that weakens stratification and prevents the formation of a region where the concentration of the fuel-air mixture is excessively high.

The six-stroke engine 1 according to the above-described first preferred embodiment is cooled in the compression stroke without ignition and the expansion stroke without combustion. That is, the average exhaust gas temperature per cycle of the six-stroke engine 1 that discharges a gas every three revolutions is lower than that of a four-stroke engine that discharges a gas every two revolutions. For this reason, the six-stroke engine 1 according to the present preferred embodiment can be equipped with a variable geometry turbocharger 16 which is unusable when the exhaust gas temperature is high, as shown in FIG. 6.

Figure 6:
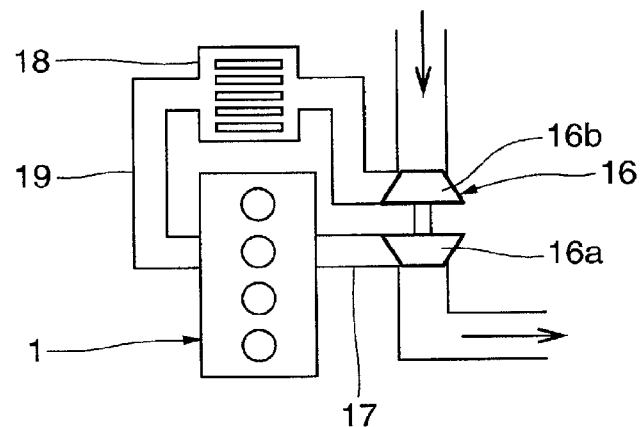
FIG. 6 is a view showing the arrangement of the six-stroke engine according to the first preferred embodiment including a variable geometry turbocharger.

More specifically, the six-stroke engine 1 shown in FIG. 6 is of a serial four-cylinder type using gasoline as fuel. The exhaust gas discharged from each cylinder of the six-stroke engine 1 is guided from the exhaust port 12 of each cylinder to the variable geometry turbocharger 16 via an exhaust pipe 17. The variable geometry turbocharger 16 is a known turbocharger including a variable nozzle (not shown) configured to control the flow rate and direction of the exhaust gas to be sent to an exhaust turbine 16a.

The six-stroke engine 1 according to the present preferred embodiment includes an intercooler 18 to cool the air sent from a compressor 16b of the variable geometry turbocharger 16. The air cooled by the intercooler 18 is sent to the intake port 13 of each cylinder via a throttle valve (not shown) provided in an intake pipe 19.

The movable portion of the variable nozzle is readily damaged by hot exhaust gas. For this reason, the variable geometry turbocharger cannot be used in an engine in which the exhaust gas temperature is very high. However, the six-stroke engine can effectively use the variable geometry turbocharger throughout the operating range because the average exhaust gas temperature per cycle is low.

According to the first preferred embodiment, it is possible to provide a six-stroke engine that obtains a higher output because the variable geometry turbocharger 16 having a wide dynamic range supercharges the engine with air.

Second Preferred Embodiment

A six-stroke engine according to the second preferred embodiment of the present invention will be described next in detail with reference to FIGS. 8 to 11C, including modifications thereof. The same reference numerals as those described with reference to FIGS. 1 to 7 denote the same or similar members in FIGS. 8 to 11C, and a detailed description thereof will appropriately be omitted.

Figure 8:
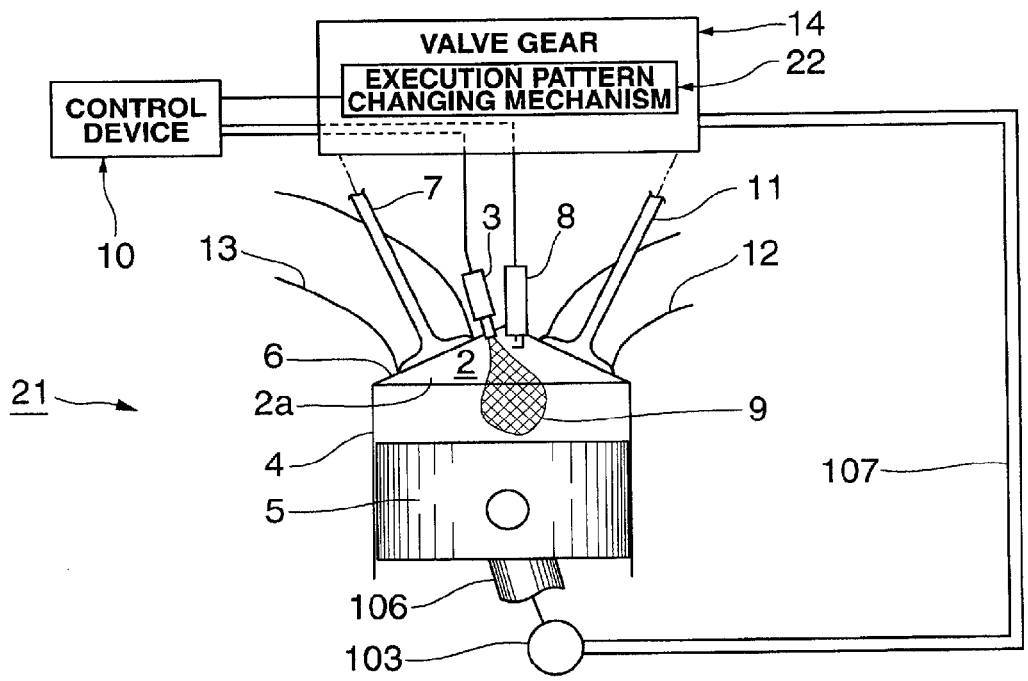
FIG. 8 is a sectional view showing the arrangement of the main portion of a six-stroke engine according to a second preferred embodiment of the present invention including an execution pattern changing mechanism.
Figure 9:
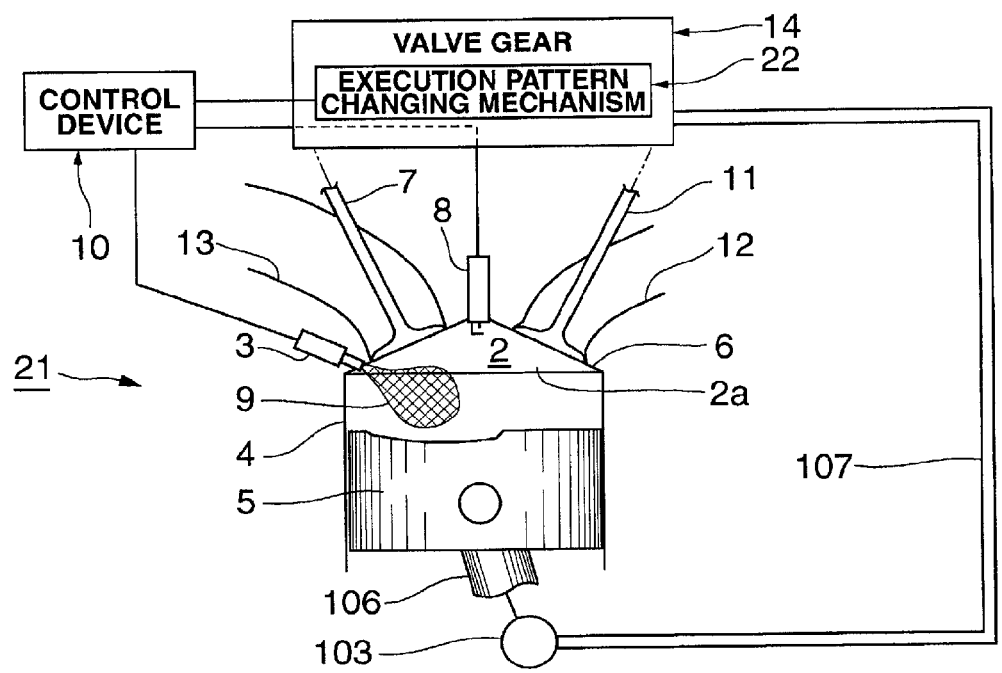
FIG. 9 is a sectional view illustrating the arrangement of the main portion of a six-stroke engine including an execution pattern changing mechanism to show a first modification of the second preferred embodiment of the present invention.

FIG. 8 shows an example of a six-stroke engine including a cylinder injector located in the vicinity of a spark plug. FIG. 9 shows a first modification applied to a six-stroke engine including a cylinder injector located on the peripheral side of a combustion chamber.

The six-stroke engine 21 according to the second preferred embodiment includes an operation method that switches between two execution patterns each including six strokes in correspondence with the operation load of the engine. Switching between the execution patterns is done by an execution pattern changing mechanism 22 shown in FIGS. 8 and 9.

The execution pattern changing mechanism 22 changes the timing at which an intake valve 7 opens, and uses some of the components of a valve gear 14. The detailed structure of the execution pattern changing mechanism 22 will be described below.

When the engine is in a low-load low-speed operating range, the execution pattern changing mechanism 22 switches the execution pattern of the six strokes to a first execution pattern to be described below under the control of a control device 10. When the engine is not in the low-load low-speed operating range, the execution pattern changing mechanism 22 switches the execution pattern of the six strokes to a second execution pattern to be described below under the control of the control device 10.

The low-load low-speed operating range indicates that the operation load (to be simply referred to as a load hereinafter) of the engine is relatively low, that is, the load value of the engine is smaller than a preset load threshold, and the rotation speed of the engine is relatively low, that is, the rotation speed is lower than a predetermined rotation speed threshold.

The load of the engine is obtained by a load calculation unit 10b (see FIG. 28) of the control device 10 based on an intake air volume detected by a load detection sensor 100.

The rotation speed of the engine is obtained by a rotation speed calculation unit 10c (see FIG. 28) of the control device 10.

Figure 28:
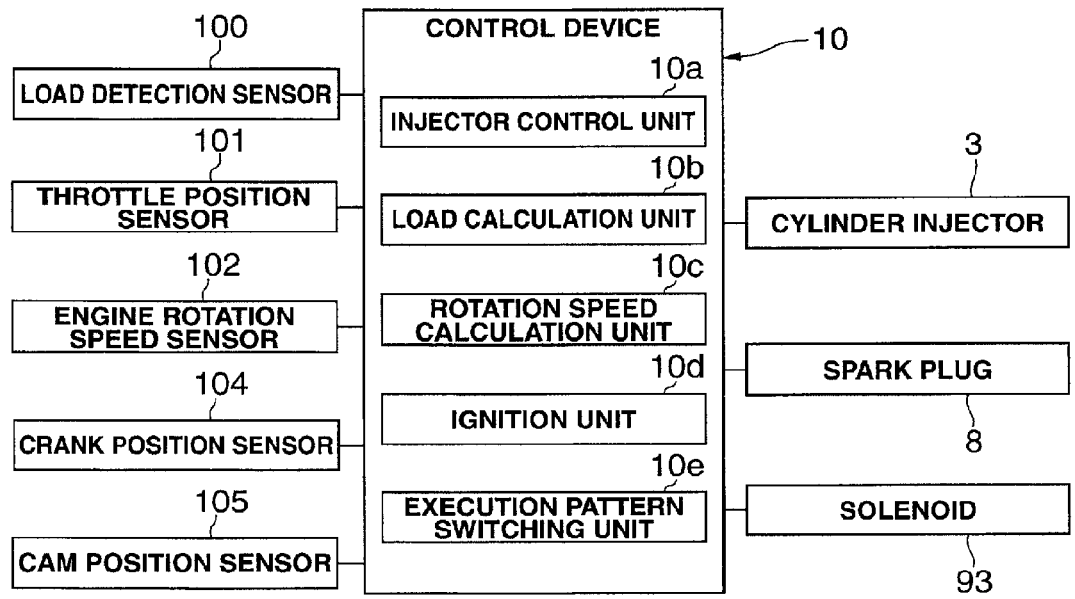
FIG. 28 is a block diagram showing the arrangement of a control device according to the second preferred embodiment of the present invention.

As shown in FIG. 28, the control device 10 according to the present preferred embodiment includes an execution pattern switching unit 10e in addition to an injector control unit 10a, the load calculation unit 10b, the rotation speed calculation unit 10c, and an ignition unit 10d described above. The execution pattern switching unit 10e controls the operation of the execution pattern changing mechanism 22. The execution pattern switching unit 10e causes the valve gear 14 (execution pattern changing mechanism 22) to change the execution pattern based on the magnitude of the load of the engine obtained by the load calculation unit 10b.

Figure 11A:
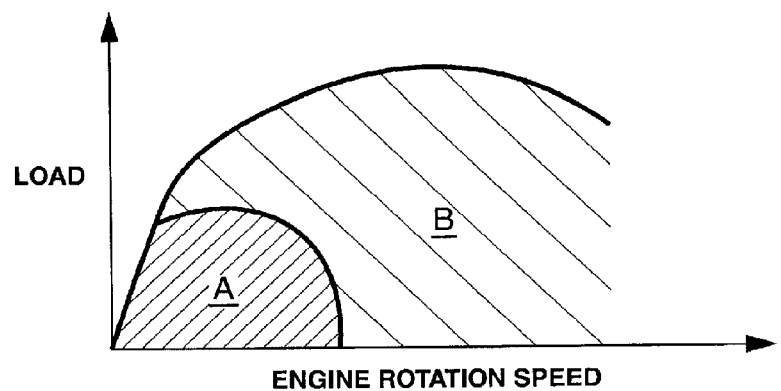
FIG. 11A is a graph showing operating ranges in which the first and second execution patterns according to a modification of the second preferred embodiment of the present invention are applied.
Figure 11B:
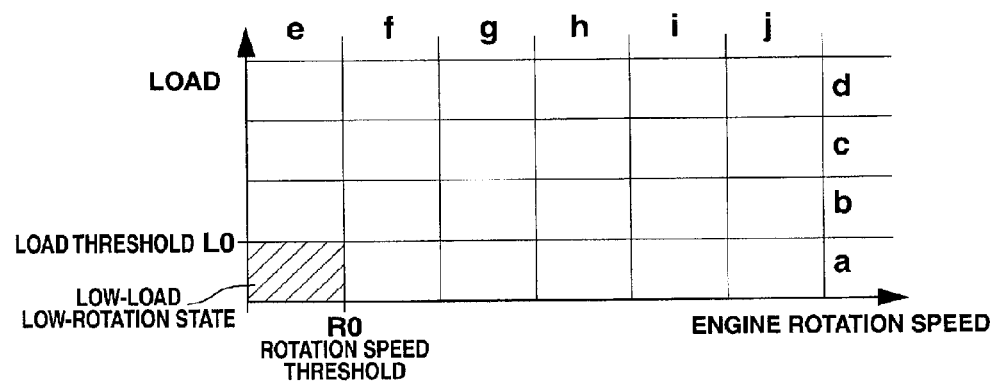
FIG. 11B is a graph showing an operating range in which the first execution pattern according to the second preferred embodiment of the present invention is applied.
Figure 11C:
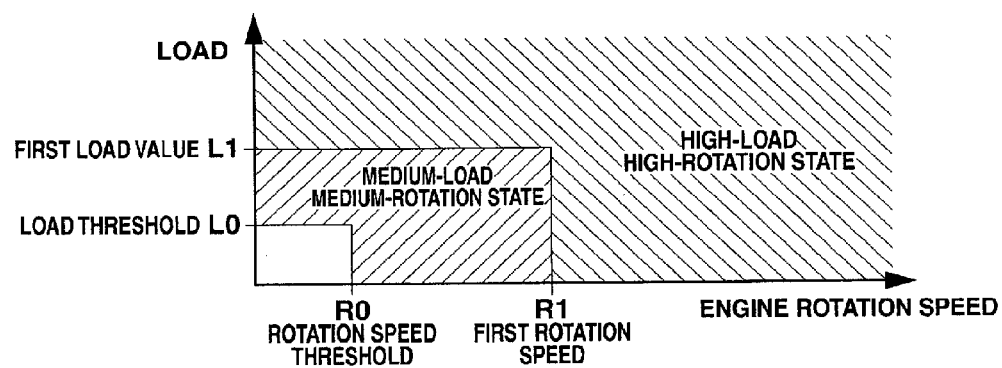
FIG. 11C is a graph showing an operating range in which the second execution pattern according to the second preferred embodiment is applied.

The control device 10 switches between the first execution pattern and the second execution pattern based on the engine rotation speed of the engine load, as shown in FIGS. 11A to 11C. The graph shown in FIG. 11A defines a map indicating an operating range where the first execution pattern is applied and an operating range in which the second execution pattern is applied. The first execution pattern is applied when the rotation speed and load of the engine fall within a range indicated by A in FIG. 11A. The second execution pattern is applied when the rotation speed and load of the engine fall within a range indicated by B in FIG. 11A.

The map shown in FIG. 11A can be expressed as shown in FIGS. 11B and 11C. The engine falls within the operating range A of the map shown in FIG. 11A in a case as shown in FIG. 11B. A load threshold L0 shown in FIG. 11B is a load value in an operating range a where the load is minimized, including the engine start time, out of a plurality of operating ranges a to d as divided stepwise in accordance with the magnitude of the load of the engine.

A rotation speed threshold R0 shown in FIG. 11B is a rotation speed in an operating range e where the rotation speed is minimized, including the engine start time, out of a plurality of operating ranges e to j as divided stepwise in accordance with the magnitude of the rotation speed of the engine.

The execution pattern switching unit 10e of the control device 10 switches the execution pattern of the six strokes to the first execution pattern in the low-load low-rotation state in which the load value obtained by the load calculation unit 10b is smaller than the load threshold L0, and the rotation speed obtained by the rotation speed calculation unit 10c is lower than the preset rotation speed threshold R0.

The engine falls within the operating range B of the map shown in FIG. 11A in a case indicated by hatching in FIG. 11C. In FIG. 11C, a medium-load medium-rotation range is indicated by backward diagonal hatching. Additionally, in FIG. 11C, a high-load high-rotation range is indicated by forward diagonal hatching. That is, the execution pattern switching unit 10e of the control device 10 switches the execution pattern of the six strokes to the second execution pattern in either the medium-load medium-rotation state or the high-load high-rotation state.

In the medium-load medium-rotation state, the load value obtained by the load calculation unit 10b is equal to or larger than the load threshold L0 and smaller than a first load value L1. The first load value L1 is larger than the load threshold L0. Additionally, in the medium-load medium-rotation state, the rotation speed obtained by the rotation speed calculation unit 10c is equal to or higher than the preset rotation speed threshold R0 and lower than a first rotation speed R1. The first rotation speed R1 is higher than the rotation speed threshold R0.

In the high-load high-rotation state, the load value obtained by the load calculation unit 10b is equal to or larger than the first load value L1, and the rotation speed obtained by the rotation speed calculation unit 10c is equal to or higher than the first rotation speed R1. Note that the load threshold L0, the first load value L1, the rotation speed threshold R0, and the first rotation speed R1 are appropriately selected based on the performance of the engine.

The first execution pattern is the same as the execution pattern shown in FIG. 3.

Figure 10:
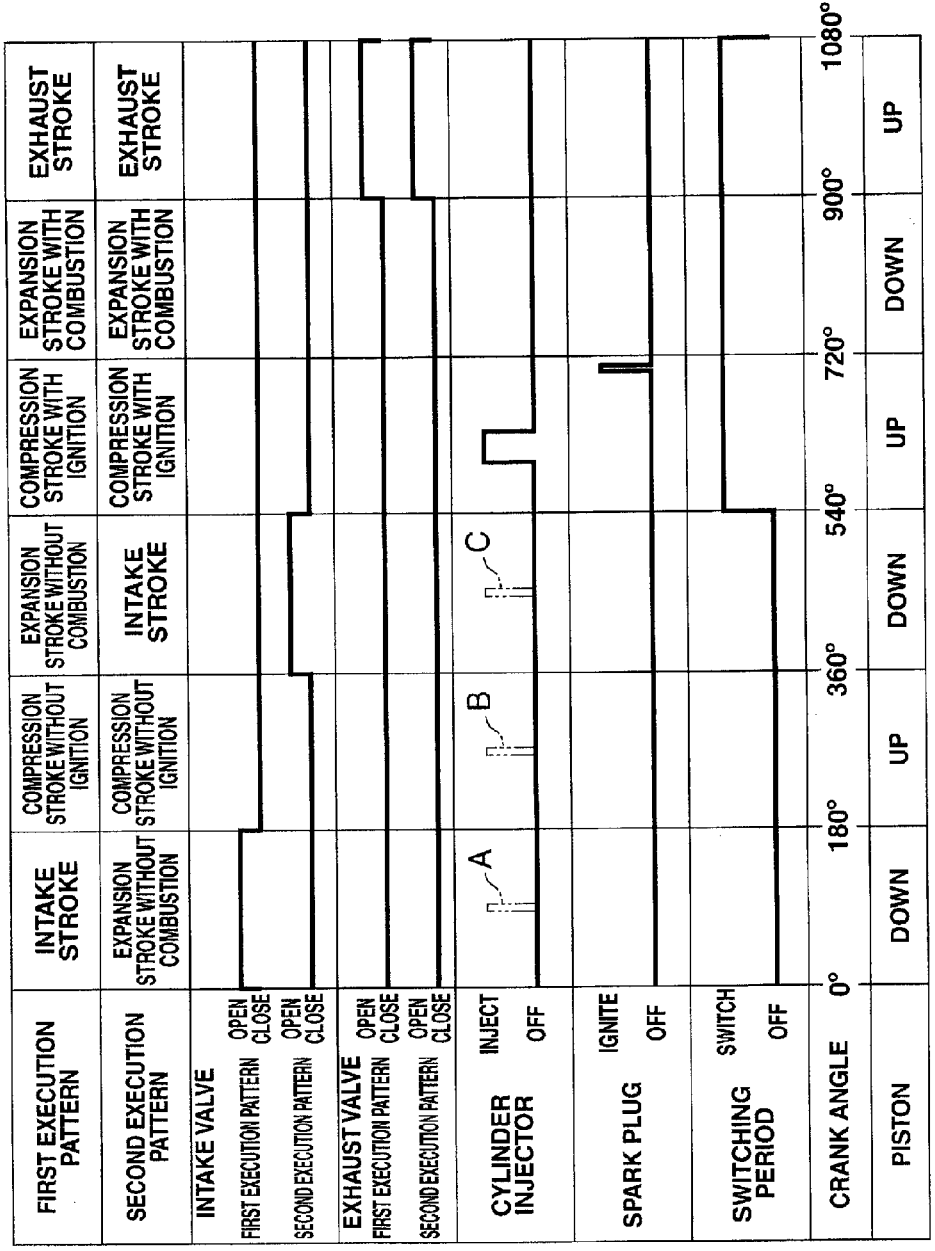
FIG. 10 is a timing chart for explaining first and second execution patterns according to the second preferred embodiment of the present invention.

In the second execution pattern, the intake stroke, the compression stroke with ignition, the expansion stroke with combustion, the exhaust stroke, the expansion stroke without combustion, and the compression stroke without ignition are executed in this order, as shown in FIG. 10.

The first execution pattern and the second execution pattern are different in the timings and order of executing the expansion stroke without combustion and the compression stroke without ignition. That is, the first execution pattern adds the compression stroke without ignition and the expansion stroke without combustion between the intake stroke and the compression stroke with ignition in the normal four-stroke engine. On the other hand, the second execution pattern adds the expansion stroke without combustion and the compression stroke without ignition between the exhaust stroke and the intake stroke in the normal four-stroke engine.

In the second preferred embodiment, switching between the first execution pattern and the second execution pattern is done by changing the opening/closing timing of the intake valve 7. This switching is performed during the operation and therefore needs to be done without largely changing the rotation of the engine. In the present preferred embodiment, the switching is performed during a period in which the intake valve 7 is closed, and the operation of the engine is not adversely affected in both the first and second execution patterns, as shown in FIG. 10. That is, the switching is done during the period from the compression stroke with ignition to the exhaust stroke.

In the operation based on the second execution pattern, a homogeneous fuel-air mixture is preferably used. Hence, a cylinder injector 3 directly injects fuel 9 into a combustion chamber 2 in the intake stroke. The injection may also be done in the compression stroke with ignition as needed. Note that the fuel 9 may be supplied using both the cylinder injector 3 and an intake channel injector 15 as shown in FIGS. 4 and 5.

The fuel injection amount in the operation based on the second execution pattern is set such that the fuel 9 mixes with air at an ideal concentration for the engine and completely burns.

A spark plug 8 is energized by the control device 10 at the end of the compression stroke with ignition.

When the six-stroke engine 21 according to the second preferred embodiment operates in accordance with the first execution pattern, stratified charge combustion is realized in a state in which the intake air volume increases, and the fuel efficiency is improved while increasing the output, as in the above-described first preferred embodiment. When the six-stroke engine 21 operates in accordance with the second execution pattern, the fuel 9 mixes with air at an ideal concentration and completely burns. It is therefore possible to obtain a higher output.

When the six-stroke engine 21 operates in accordance with the second execution pattern, the expansion stroke without combustion and the compression stroke without ignition are executed after the exhaust stroke is executed, and only a small quantity of gas remains in the cylinder. For this reason, the pumping loss decreases, and the output increases. In the second preferred embodiment, the operation based on the second execution pattern thus decreases the pumping loss and increases the output. Hence, the operation is done based on the second execution pattern in the high-rotation high-load range where a high output is necessary.

For this reason, the six-stroke engine 21 can switch between an operation preferring fuel efficiency and an operation preferring output. Hence, according to the present preferred embodiment, it is possible to provide a six-stroke engine that improves the fuel efficiency and at the same time increases the output.

In the six-stroke engine 21 according to the second preferred embodiment, the period in which the two strokes (expansion stroke without combustion and compression stroke without ignition) following the exhaust stroke are executed in the second execution pattern is substantially the engine cooling period. Hence, the average exhaust gas temperature per cycle of the six-stroke engine 21 is lower than that of a four-stroke engine. Since the average exhaust gas temperature per cycle of the engine is relatively low, the six-stroke engine 21 according to the present preferred embodiment can also use a variable geometry turbocharger 16 as shown in FIG. 6.

In the present preferred embodiment, switching between the first execution pattern and the second execution pattern is performed by changing the opening/closing timing of the intake valve 7. In this case, the opening/closing timing of an exhaust valve 11 does not change upon pattern switching, as shown in FIG. 10. For this reason, the ignition timing need not be changed when switching between the first execution pattern and the second execution pattern. Hence, according to the present preferred embodiment, it is possible to provide a six-stroke engine that easily controls the operation regardless of using an arrangement that switches between the first execution pattern and the second execution pattern.

Using the arrangement shown FIG. 10 makes the period switching between the first execution pattern and the second execution pattern relatively long. When a long switching period is ensured, the load of the mechanism that switches between the first execution pattern and the second execution pattern is made small because the operation speed of the mechanism is low. Hence, the durability of the mechanism improves.

For this reason, the six-stroke engine 21 according to the present preferred embodiment improves the fuel efficiency when the operating range is A in FIG. 11A, that is, the practical range including idling. In addition, the six-stroke engine 21 can obtain a high output when the operating range is B in FIG. 11A, that is, the medium-rotation medium-load range or high-rotation high-load range.

The above-described execution pattern changing mechanism 22 of the six-stroke engine 21 can be as shown in FIGS. 12 to 26. The same reference numerals as those described with reference to FIGS. 1 to 11C denote the same or similar members in FIGS. 12 to 26, and a detailed description thereof will appropriately be omitted.

Figure 12:
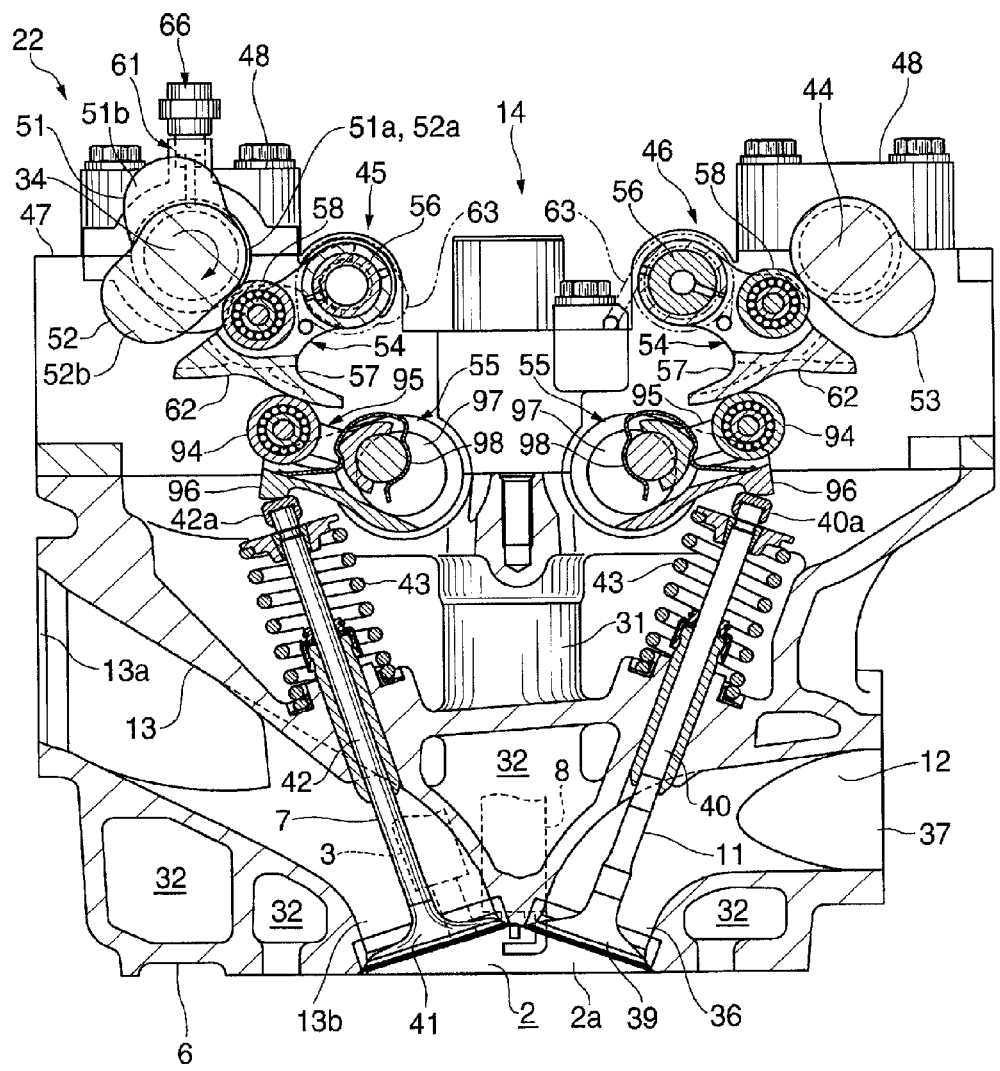
FIG. 12 is a sectional view of a cylinder head used in the six-stroke engine according to the second preferred embodiment of the present invention.

A ceiling wall 2a of the combustion chamber 2, an exhaust port 12, an intake port 13, an injector storage (not shown), a spark plug storage 31, a cooling water jacket 32, and the like are provided in a cylinder head 6 shown in FIG. 12. Pairs of the exhaust valve 11 and the intake valve 7 are provided in each cylinder, and the valve gear 14 that drives the exhaust valve 11 and the intake valve 7 are attached to the cylinder head 6.

Figure 13:
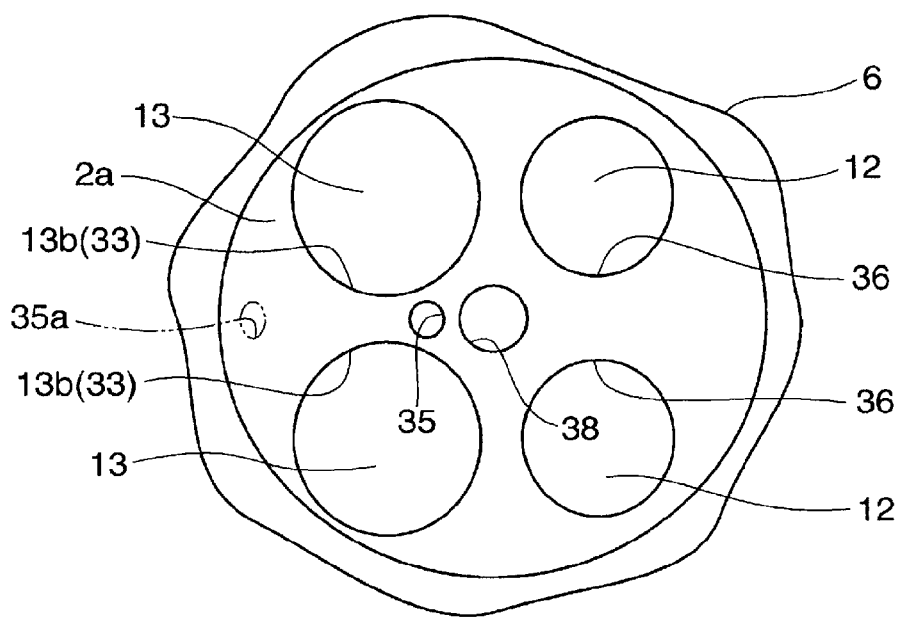
FIG. 13 is a bottom view showing the ceiling wall of a combustion chamber according to the second preferred embodiment of the present invention.

The intake port 13 forks into two branches inside the cylinder head 6. An upstream end 13a of the intake port 13 is open to one side portion of the cylinder head 6. Downstream ends 13b of the intake port 13 are open to the ceiling wall 2a of the combustion chamber 2, as shown in FIG. 13. Intake outlets 33 that define the downstream ends 13b of the intake port 13 are arranged to be spaced apart from each other at a predetermined interval in the axial direction (upward/downward direction in FIG. 13) of an intake camshaft 34 to be described below. When the cylinder injector 3 is arranged in the vicinity of the spark plug 8 (see FIG. 8), a hole 35 of the injector storage is opened between the two intake outlets 33. The injector storage is used to attach the cylinder injector 3 to the cylinder head 6. Note that a hole 35a indicated by an alternate long and two short dashed line in FIG. 13 is the hole of the injector storage when the cylinder injector 3 is arranged on the outer circumference side of the combustion chamber 2.

The intake port 13 is a high flow rate port having a shape that makes the intake resistance as small as possible. That is, the intake port 13 is arranged to obliquely and linearly extend from the upstream end 13a toward the combustion chamber 2 and moderately bend in the vicinity of the intake valve 7.

The exhaust port 12 extends from two exhaust inlets 36 open to the ceiling wall 2a to one exhaust outlet 37 open to the other side portion of the cylinder head 6.

A hole 38 of the spark plug storage 31 is open to a portion surrounded by the two intake outlets 33 of the intake port 13 and the two exhaust inlets 36 of the exhaust port 12. The spark plug storage 31 is used to attach the spark plug 8 to the cylinder head 6.

The exhaust valve 11 includes a valve element 39 that opens/closes the exhaust inlets 36 of the exhaust port 12, and a shaft-shaped stem 40. The intake valve 7 includes a valve element 41 that opens/closes the intake outlets 33 of the intake port 13 and a shaft-shaped stem 42, as shown in FIG. 12. The stems 40 and 42 of the exhaust valve 11 and the intake valve 7 are movably supported by the cylinder head 6 and biased by valve springs 43 in the closing direction. Shims 40a and 42a are mounted on the distal ends of the stems 40 and 42, respectively.

The valve gear 14 includes the intake camshaft 34, an exhaust camshaft 44, an intake camshaft driving mechanism 45, an exhaust camshaft driving mechanism 46, and a driving mechanism 107 (see FIGS. 1 and 2) that transmits the rotation of a crankshaft 103 to the intake camshaft 34 and the exhaust camshaft 44. The intake camshaft 34 and the exhaust camshaft 44 are rotatably supported by a support member 47 and cam caps 48. The support member 47 is attached to the cylinder head 6. The cam caps 48 are attached to the support member 47 such that the intake camshaft 34 and the exhaust camshaft 44 are sandwiched between the cam caps 48 and the support member 47.

Figure 14:
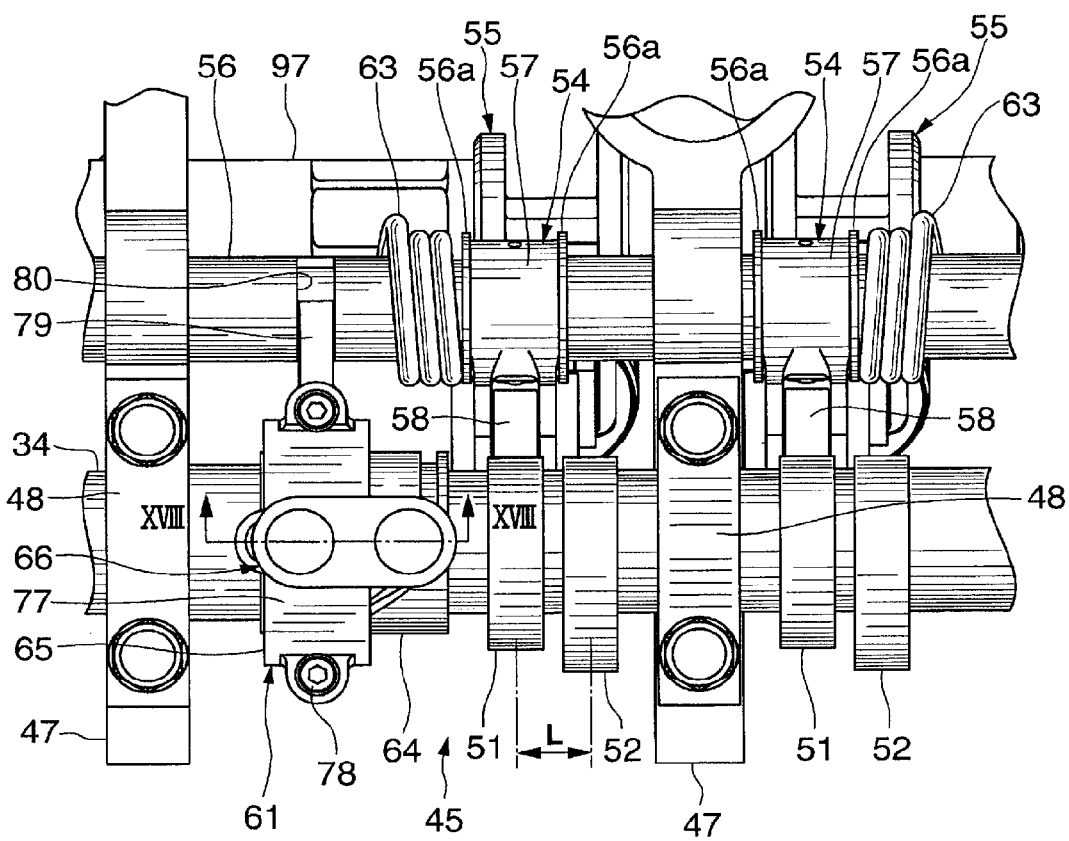
FIG. 14 is an enlarged plan view showing a portion of a valve gear according to the second preferred embodiment of the present invention.

The intake camshaft 34 includes a first intake cam 51 for the first execution pattern, and a second intake cam 52 for the second execution pattern. The first intake cam 51 and the second intake cam 52 are provided for each intake valve 7. As shown in FIG. 14, the first intake cam 51 and the second intake cam 52 are arranged at a predetermined interval in the axial direction of the intake camshaft 34. As shown in FIG. 12, the first intake cam 51 and the second intake cam 52 include circular base portions 51*a* and 52*a* and nose portions 51*b* and 52*b*, respectively. The intake camshaft 34 according to the present preferred embodiment rotates clockwise in FIG. 12.

The circular base portions 51*a* and 52*a* are arranged to not open the intake valve 7. The nose portions 51*b* and 52*b* are arranged to open the intake valve 7 with a predetermined opening at a predetermined timing. As for the cam profile, each of the nose portions 51*b* and 52*b* according to the present preferred embodiment preferably is formed by dividing an ellipse into two portions in the longitudinal direction, as shown in FIG. 12.

The exhaust camshaft 44 includes an exhaust cam 53 for each exhaust valve 11.

The intake camshaft driving mechanism 45 converts the rotation of the intake camshaft 34 into a reciprocating motion and transmits it to the intake valve 7. The intake camshaft driving mechanism 45 has the above-described function of switching between the first execution pattern and the second execution pattern.

Figure 21:
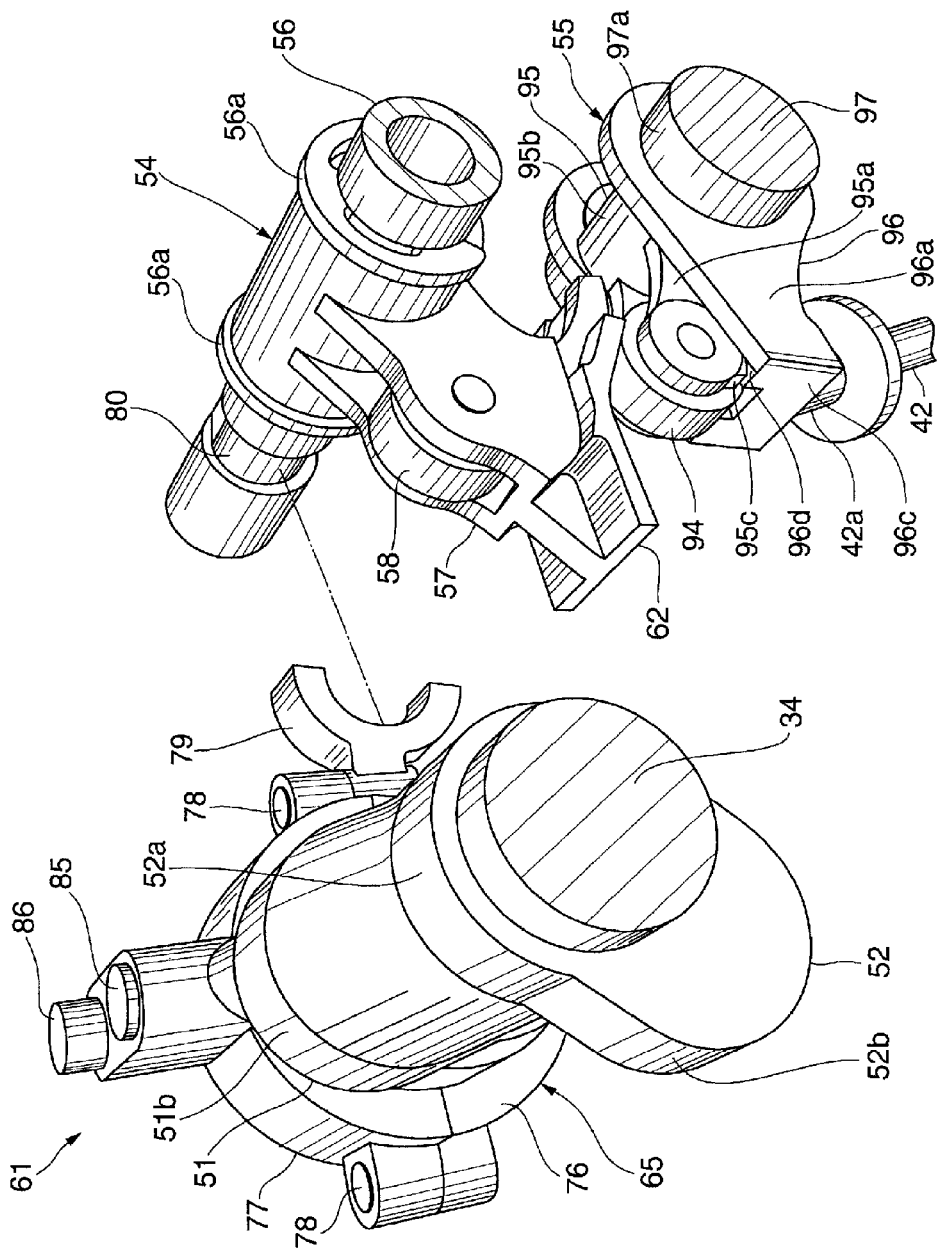
FIG. 21 is an exploded perspective view of an intake camshaft driving mechanism according to the second preferred embodiment of the present invention.

As shown in FIG. 21, the intake camshaft driving mechanism 45 includes a swing cam 54 located in the vicinity of the intake camshaft 34, and a rocker arm 55 located between the swing cam 54 and the intake valve 7. The swing cam 54 and the rocker arm 55 are provided for each intake valve 7.

The exhaust camshaft driving mechanism 46 converts the rotation of the exhaust camshaft 44 into a reciprocating motion and transmits it to the exhaust valve 11. The exhaust camshaft driving mechanism 46 is different from the intake camshaft driving mechanism 45 in that the mechanism that switches the execution pattern is not provided, and the driving target is the exhaust valve 11. However, the rest of the arrangement of the exhaust camshaft driving mechanism 46 is the same as the intake camshaft driving mechanism 45. Hence, the same reference numerals as those in the intake camshaft driving mechanism 45 denote members having the same functions in the exhaust camshaft driving mechanism 46, and a detailed description thereof will appropriately be omitted.

As shown in FIG. 12, the swing cam 54 of the intake camshaft driving mechanism 45 includes a swing cam main body 57 through which a support shaft 56 parallel or substantially parallel to the intake camshaft 34 extends, and a roller 58 rotatably attached to the swing cam main body 57. The axis of the roller 58 is parallel or substantially parallel to the axis of the intake camshaft 34.

Figure 19:
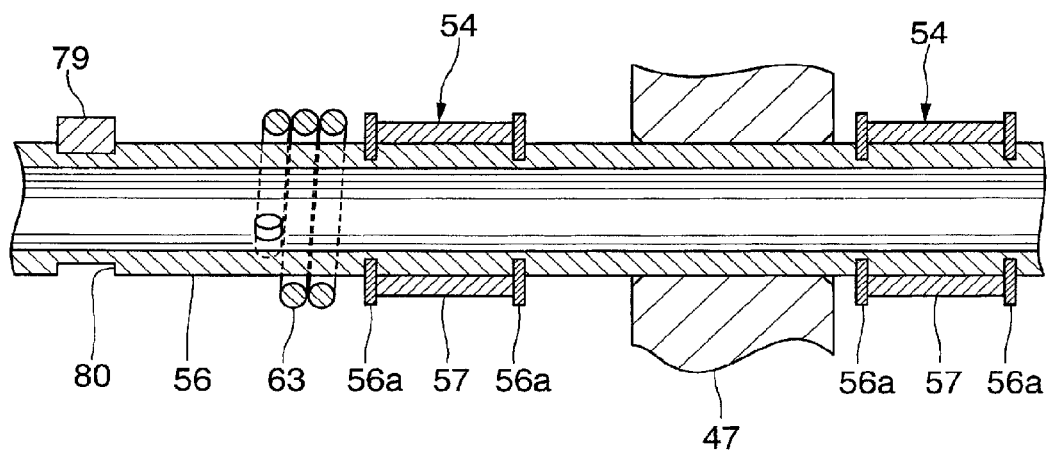
FIG. 19 is a sectional view of a support shaft portion taken along a line XIX-XIX in FIG. 17.

The support shaft 56 is provided at a position spaced apart from the intake camshaft 34 toward the exhaust camshaft 44, and supported by the support member 47 to be movable in the axial direction but not rotatable. The support shaft 56 is provided for each cylinder. As shown in FIG. 19, the support shaft 56 supports the swing cams 54, which are provided two per cylinder, in the same supporting state. A driving device 61 to be described below is connected to the support shaft 56, as shown in FIG. 14.

The driving device 61 moves the support shaft 56 in the axial direction by a predetermined switching length L (see FIG. 14). The detailed structure of the driving device 61 will be described below. The driving device 61 is also provided for each cylinder. The switching length L corresponds to the interval between the first intake cam 51 and the second intake cam 52. The interval indicates the length between the axial-direction center of the first intake cam 51 and that of the second intake cam 52.

When the support shaft 56 moves in the axial direction by the switching length L, the above-described switching between the first execution pattern and the second execution pattern is performed. The direction in which the support shaft 56 moves upon switching from the second execution pattern to the first execution pattern is the leftward direction or the direction from the second intake cam 52 to the first intake cam 51 in FIG. 14. The direction in which the support shaft 56 moves upon switching from the first execution pattern to the second execution pattern is the rightward direction or the direction from the first intake cam 51 to the second intake cam 52 in FIG. 14. The direction from the second intake cam 52 to the first intake cam 51 will be referred to as "one side in the axial direction", and the reverse direction will be referred to as "the other side in the axial direction" hereinafter.

The swing cam main body 57 is swingably supported by the support shaft 56. The swing cam main body 57 is sandwiched between E rings 56*a* (see FIG. 14) attached to the support shaft 56 not to be movable in the axial direction of the support shaft 56. That is, when the driving device 61 moves the support shaft 56 in the axial direction, the swing cam 54 moves in the axial direction integrally with the support shaft 56.

Figure 15:
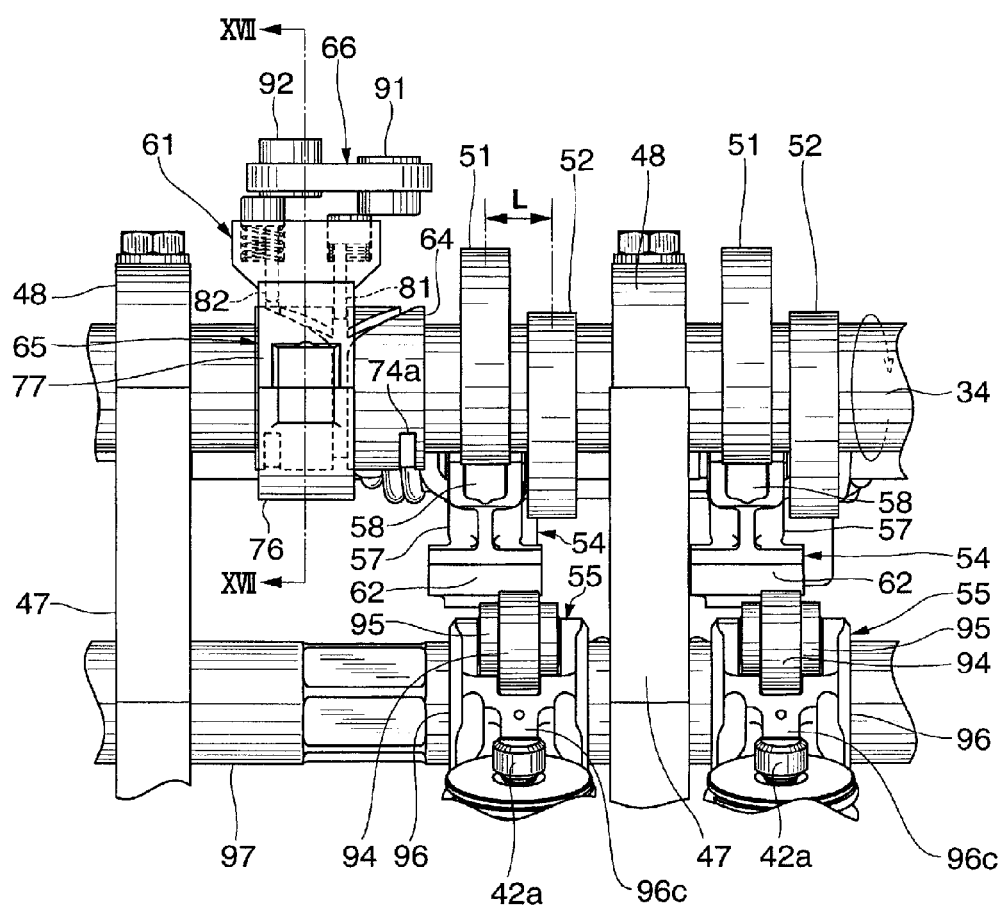
FIG. 15 is an enlarged side view showing a portion of the valve gear according to the second preferred embodiment of the present invention.

A cam surface 62 that is in contact with the rocker arm 55 to be described below is provided at the swing end of the swing cam main body 57. As shown in FIG. 15, the cam surface 62 has a predetermined width in the axial direction of the intake camshaft 34. The predetermined width equals the sum of the axial width of the first intake cam 51, the axial width of the second intake cam 52, and the width of the gap between these cams. That is, the cam surface 62 remains in contact with the rocker arm 55 to be described below even when the swing cam 54 moves in the axial direction together with the support shaft 56. In other words, the contact portion between the swing cam 54 and the rocker arm 55 has such a shape that allows the swing cam 54 to move in the axial direction while keeping a state in which the two members are in contact.

Figure 16:
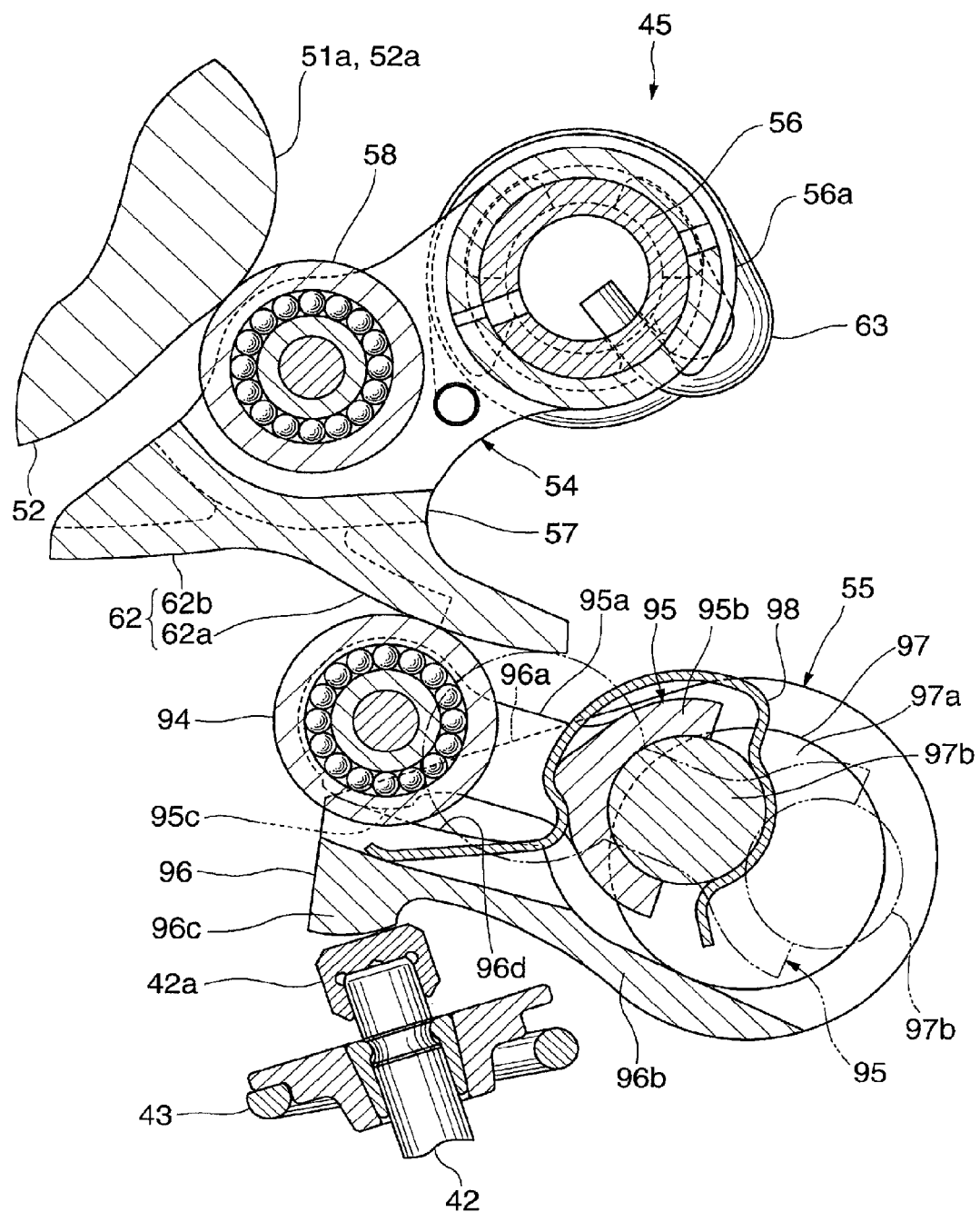
FIG. 16 is a sectional view of a swing cam and a rocker arm according to the second preferred embodiment of the present invention.

As shown in FIG. 16, the cam surface 62 includes a base arc portion 62*a* and a lift portion 62*b*. The base arc portion 62*a* and the lift portion 62*b* are continuous in the direction in which the swing cam 54 swings. The base arc portion 62*a* is located in front of the lift portion 62*b* in the direction in which the swing cam 54 swings at the time of a valve opening.

The base arc portion 62*a* has an arcuate shape with respect to the axis of the support shaft 56 as the center when viewed from the axial direction of the intake camshaft 34. The lift portion 62*b* gradually increases the distance from the axis of the support shaft 56 as it separates from the base arc portion 62*a*.

The roller 58 is attached to the swing cam main body 57 so as to project from the swing cam main body 57 toward the intake camshaft 34. In a state in which the support shaft 56 has moved to one side in the axial direction, the roller 58 rotates in contact with the first intake cam 51. In a state in which the support shaft 56 has moved to the other side in the axial direction, the roller 58 rotates in contact with the second intake cam 52. The swing cam 54 according to the present preferred embodiment is biased by a helical torsion coil spring 63 (see FIG. 14) so that the roller 58 is always in contact with the first intake cam 51 or the second intake cam 52. The support shaft 56 extends through the helical torsion coil spring 63 and thus supports it.

As shown in FIG. 15, the driving device 61 that drives the support shaft 56 includes a large-diameter portion 64 of the intake camshaft 34, a slider 65 through which the large-diameter portion 64 extends, and an actuator 66 provided at a position adjacent to the slider 65.

Figure 20:
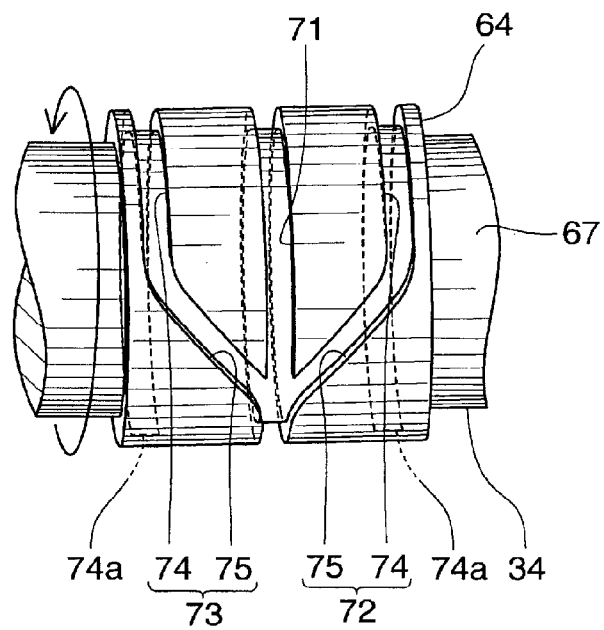
FIG. 20 is a perspective view showing the large-diameter portion of an intake cam according to the second preferred embodiment of the present invention.

As shown in FIG. 20, the large-diameter portion 64 is arranged such that the outer diameter becomes larger than that of a shaft portion 67 of the intake camshaft 34.

Figure 18:
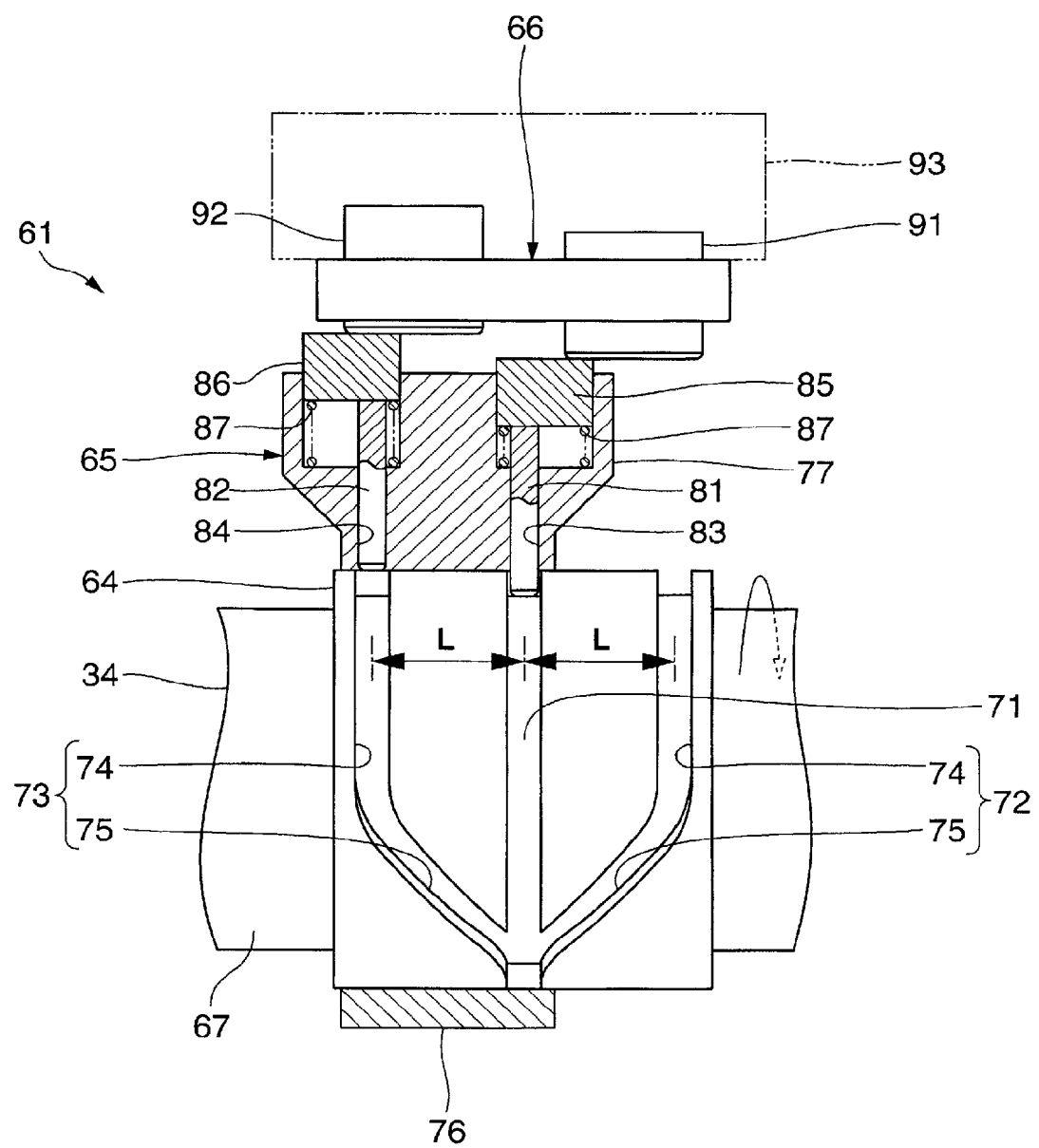
FIG. 18 is a sectional view of a driving device taken along a line XVIII-XVIII in FIG. 14.

As shown in FIG. 18, an annular groove 71 extending in the circumferential direction of the large-diameter portion 64, and a first cam groove 72 and a second cam groove 73, which are located on both sides of the annular groove 71, are provided in the large-diameter portion 64. As shown in FIG. 20, the annular groove 71 extends a predetermined depth throughout the circumference of the large-diameter portion 64. Each of the first cam groove 72 and the second cam groove 73 includes a linear portion 74 parallel or substantially parallel to the annular groove 71, and a tilted portion 75 that connects the linear portion 74 to the annular groove 71. The groove width of the first cam groove 72 and the second cam groove 73 equals that of the annular groove 71.

The linear portion 74 of the first cam groove 72 is located on the right side of the annular groove 71 in FIG. 18. That is, the linear portion 74 of the first cam groove 72 is located at a position spaced apart from the annular groove 71 to the other side in the axial direction by the switching length L. The linear portion 74 of the second cam groove 73 is located at a position spaced apart from the annular groove 71 to one side in the axial direction by the switching length L. The linear portions 74 gradually decrease their depth toward the front side (upper side in FIG. 18) in the rotation direction of the intake camshaft 34. One end of the linear portion 74 located on the side opposite to the tilted portion 75 is flush with the outer surface of the remaining portion of the large-diameter portion 64.

The tilted portion 75 of each of the first cam groove 72 and the second cam groove 73 obliquely extends from the linear portion 74 toward the annular groove 71. As indicated by "groove depth" in FIG. 22, the tilted portion 75 gradually increases in depth toward the back side in the rotation direction of the intake camshaft 34. The depth of the tilted portion 75 finally equals the depth of the annular groove 71.

Figure 17:
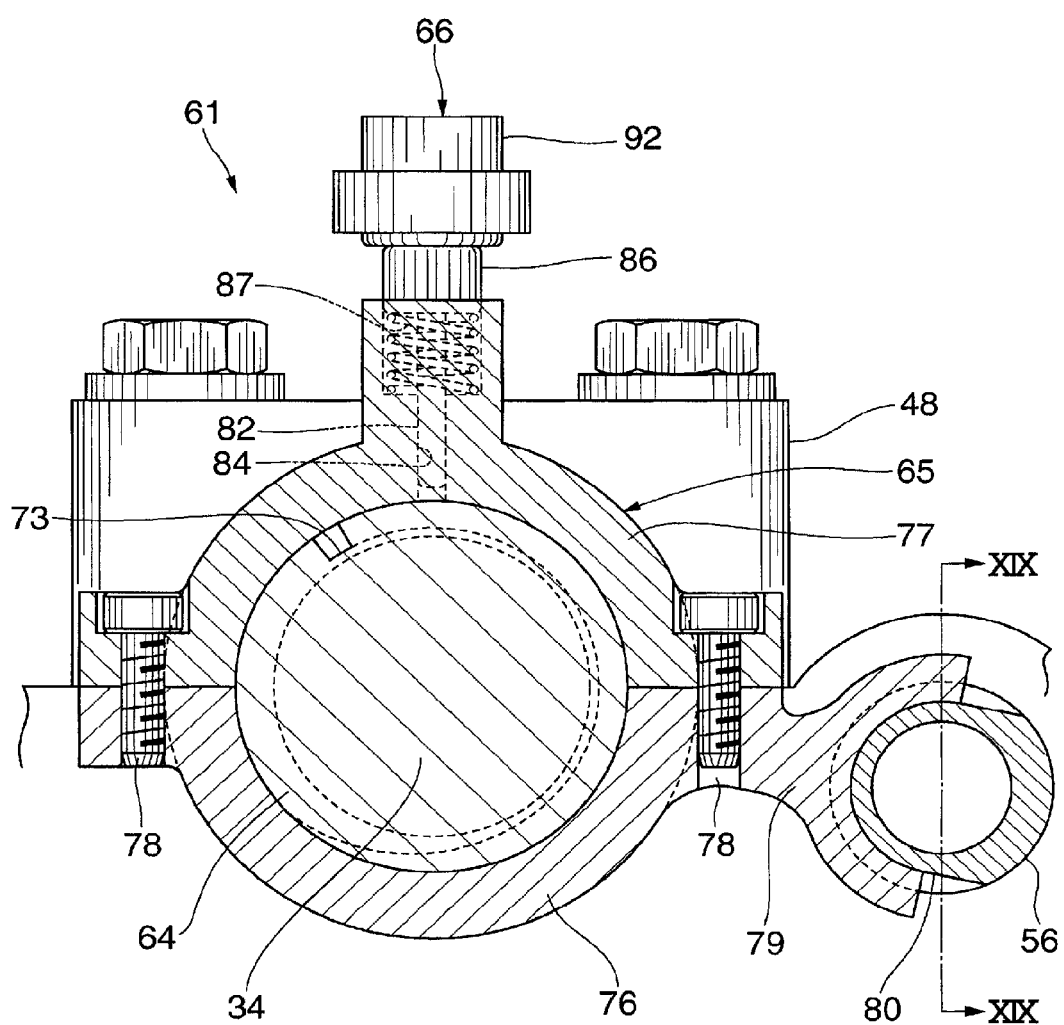
FIG. 17 is a sectional view of an intake camshaft and a slider taken along a line XVII-XVII in FIG. 15.

As shown in FIG. 17, the slider 65 includes a lower half portion 76 and an upper half portion 77, which sandwich the large-diameter portion 64 from both sides in the radial direction. The lower half portion 76 and the upper half portion 77 are connected with each other preferably by connecting bolts 78 and are movable along the large-diameter portion 64.

An arm 79 that connects the slider 65 to the support shaft 56 is provided on the lower half portion 76. The distal end of the arm 79 has a C sectional shape open toward the support shaft 56, and fits in a groove 80 of the support shaft 56.

The arm 79 also has a function of regulating rotation of the slider 65 integrated with the intake camshaft 34.

As shown in FIG. 18, the upper half portion 77 of the slider 65 includes a first pin 81 and a second pin 82, which preferably have a cylindrical shape and are parallel or substantially parallel to each other. The first pin 81 and the second pin 82 are movably inserted in through holes 83 and 84 provided in the upper half portion 77, respectively.

The through holes 83 and 84 extend in a direction perpendicular or substantially perpendicular to the axial direction of the intake camshaft 34 and are oriented toward the axis of the intake camshaft 34. The interval between the through holes 83 and 84 matches the above-described switching length L. That is, the first pin 81 and the second pin 82 are supported by the upper half portion 77 such that their one-end sides can be inserted into the annular groove 71 and one of the first cam groove 72 and the second cam groove 73.

A first lifter 85 and a second lifter 86 are attached to the other-end sides of the first pin 81 and the second pin 82, respectively. The first lifter 85 and the second lifter 86 are movably supported by the upper half portion 77. The first lifter 85 and the second lifter 86 are biased by compression coil springs 87 in a direction in which the lifters separate from the intake camshaft 34, and are pressed against a first plunger 91 and the second plunger 92 of the actuator 66 to be described below.

The actuator 66 includes the first plunger 91 and the second plunger 92, which preferably have a cylindrical shape and face the lifters 85 and 86, and a solenoid 93 configured to drive the first plunger 91 and the second plunger 92. The actuator 66 is supported by the cylinder head 6 or a head cover (not shown). The solenoid 93 drives the first plunger 91 and the second plunger 92 under the control of the execution pattern switching unit 10e of the control device 10.

The first plunger 91 and the second plunger 92 are driven by the solenoid 93 and moved forward or backward with respect to the lifters 85 and 86. For example, as shown in FIG. 18, when the first plunger 91 presses the first lifter 85 against the spring force of the compression coil spring 87, the first pin 81 is pressed toward the large-diameter portion 64. Note that when the first plunger 91 moves forward toward the first lifter 85, the second plunger 92 moves backward. When the second plunger 92 moves backward, the second lifter 86 and the second pin 82 are moved backward by the spring force of the compression coil spring 87, as shown in FIG. 18.

When the first plunger 91 moves backward, and the second plunger 92 moves forward from the state shown in FIG. 18, the first pin 81 moves backward together with the first lifter 85 and exits from the annular groove 71. At this time, the second pin 82 moves forward together with the second lifter 86 and is pressed against the large-diameter portion 64 at a position corresponding to the second cam groove 73. When the intake camshaft 34 rotates in this state, the second pin 82 enters the second cam groove 73. When passing through the tilted portion 75 of the second cam groove 73, the second pin 82 is pressed by the side wall of the tilted portion 75, and the slider 65 moves rightward (one side in the axial direction) in FIG. 18. After that, the second pin 82 enters the annular groove 71 and moves in it.

To move the slider 65 in the direction reverse to the above-described direction, the second plunger 92 is moved backward, and the first plunger 91 is moved forward toward the first lifter 85. The first plunger 91 and the second plunger 92 are arranged to not disengage from the first lifter 85 and the second lifter 86 when the slider 65 moves, as described above.

Figure 22:
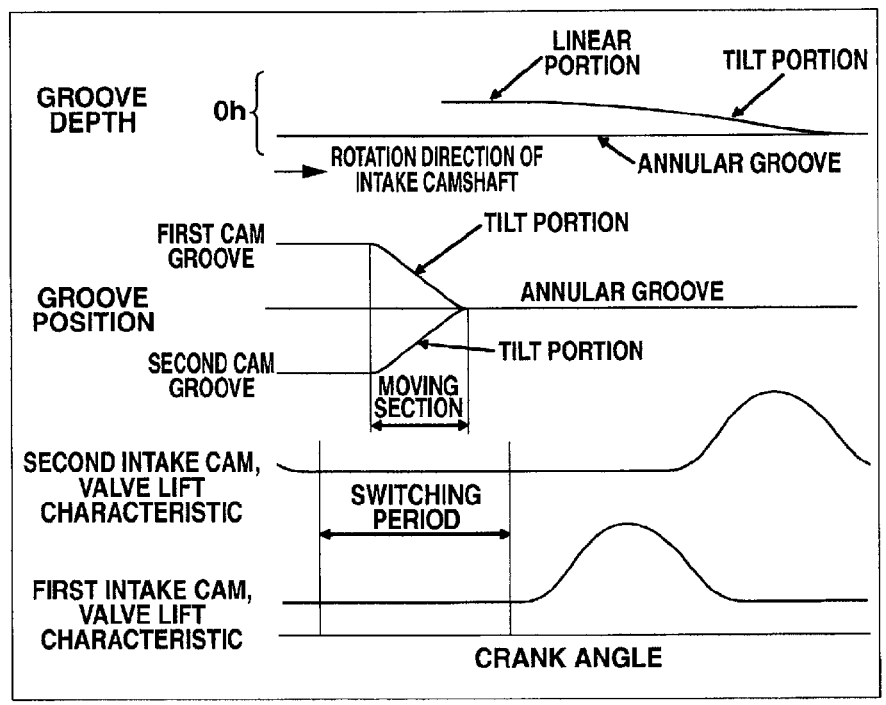
FIG. 22 is a graph showing the relationship between the crank angle and the valve lift amounts of an intake valve by first and second intake cams and the position and depth of each groove according to the second preferred embodiment of the present invention.

As shown in FIG. 22, the driving device 61 according to the second preferred embodiment is configured such that the first pin 81 and the second pin 82 pass through the tilted portions 75 of the first cam groove 72 and the second cam groove 73 within the switching period in which switching between the first execution pattern and the second execution pattern is performed. That is, the swing cam 54 moves in the axial direction in a state in which the roller 58 of the swing cam 54 is in contact with the circular base portion 51a of the first intake cam 51 or the circular base portion 52a of the second intake cam 52.

The rocker arm 55 includes an arrangement to transmit the swing operation of the swing cam 54 to the intake valve 7 by a plurality of swing members. As shown in FIG. 16, the plurality of members include a control arm 95 including a roller 94 in contact with the cam surface 62 of the swing cam 54, and a rocker arm main body 96 in contact with the intake valve 7. The control arm 95 and the rocker arm main body 96 are swingably supported by a rocker shaft 97.

The rocker shaft 97 is rotatably supported by the cylinder head 6 and the support member 47 in a state in which its axis is parallel or substantially parallel to that of the intake camshaft 34. The rocker shaft 97 preferably has a so-called crankshaft shape. That is, the rocker shaft 97 includes a main shaft 97a located on the same axis as that of the portion supported by the cylinder head 6 and the support member 47, and an eccentric pin 97b decentered from the main shaft 97a, as shown in FIG. 16.

The main shaft 97a is configured to swingably support a pair of arm portions 96a of the rocker arm main body 96. The main shafts 97a are provided at positions corresponding to the pair of arm portions 96a. The eccentric pin 97b connects the main shafts 97a with each other. The eccentric pin 97b is configured to swingably support the control arm 95.

A driving mechanism such as a servo motor (not shown) is connected to one end of the rocker shaft 97. The rocker shaft 97 is driven and rotated through a predetermined pivot angle by the driving mechanism.

The rocker arm main body 96 includes a pair of arm portions 96a and a bottom wall 96b that connects the arm portions 96a. A press element 96c configured to press the shim 42a of the intake valve 7 is provided on the bottom wall 96b.

The control arm 95 includes a control arm main body 95a pivotally supported by the eccentric pin 97b, and the roller 94 rotatably provided at the swing end of the control arm main body 95a. A base 95b of the control arm main body 95a connected to the eccentric pin 97b preferably has a C sectional shape fitted on the eccentric pin 97b. The base 95b is held by a leaf spring 98 so that it cannot separate from the eccentric pin 97b.

A press element 95c configured to press the rocker arm main body 96 is provided at the swing end of the control arm main body 95a. The press element 95c is in contact with a step portion 96d provided on the inner surfaces of the arm portions 96a. The step portion 96d extends in the longitudinal direction of the arm portions 96a.

The control arm 95 moves in the longitudinal direction of the arm portions 96a as the rocker shaft 97 rotates, and the position of the eccentric pin 97b changes. When the control arm 95 is located close to the intake camshaft 34, as shown in FIG. 16, the lift portion 62b of the cam surface 62 presses the roller 58 by a relatively large amount, and the intake valve 7 opens by a relatively large amount. On the other hand, when the position of the eccentric pin 97b changes, and the control arm 95 moves to the position indicated by the alternate long and two short dashed line in FIG. 16, the roller 58 comes into contact with only the base arc portion 62a of the cam surface 62, and the intake valve 7 is kept closed. The opening/closing timing and lift amount of the intake valve 7 can freely be set suitably for the engine operation state by continuously changing the position of the eccentric pin 97b.

In the second preferred embodiment, the driving device 61, the support shaft 56 movable in the axial direction, and the swing cam 54 including the cam surface 62 that is wide in the axial direction constitute an "execution pattern changing mechanism."

The operations of the execution pattern changing mechanism 22 and the execution pattern switching unit 10e of the control device 10 will be described below with reference to FIGS. 11B and 11C and the flowchart of FIG. 29. When the engine operates, the load calculation unit 10b of the control device 10 detects the load of the engine, and the rotation speed calculation unit 10c detects the rotation speed of the engine as indicated by steps S1 and S2 in FIG. 29.

In step S3, the execution pattern switching unit 10e of the control device 10 determines whether the current load value obtained by the load calculation unit 10b is smaller than the load threshold L0.

If the current load value is smaller than the load threshold L0, the control device 10e determines in step S4 whether the current rotation speed obtained by the rotation speed calculation unit 10c is lower than the predetermined rotation speed threshold R0. If the current rotation speed is lower than the predetermined rotation speed threshold R0 in step S4, the execution pattern switching unit 10e operates the solenoid 93 of the actuator 66 to implement the first execution pattern. The operating range in this case is the hatched operating range shown in FIG. 11B. At this time, the solenoid 93 moves the first plunger 91 forward toward the first lifter 85 and the second plunger 92 backward, as shown in FIG. 15.

When the first plunger 91 presses the first lifter 85, the first pin 81 passes through the annular groove 71. For this reason, the six strokes are executed in accordance with the first execution pattern using the first intake cam 51.

That is, the six-stroke engine 21 according to the second preferred embodiment operates in accordance with the first execution pattern using the first intake cam 51 in the low-load low-rotation state including the time of starting the engine.

If the current load value is smaller than the load threshold L0, and the current rotation speed is equal to or higher than the rotation speed threshold R0 and lower than the first rotation speed R1, the execution pattern switching unit 10e ends step S5 with "YES" and operates the solenoid 93 to implement the second execution pattern. In the following two cases as well, the execution pattern switching unit 10e operates the solenoid 93 to implement the second execution pattern. The first case is a case in which the current load value is equal to or larger than the load threshold L0 and smaller than the first load value L1, and the current rotation speed is lower than the rotation speed threshold R0. The second case is a case in which the current load value is equal to or larger than the load threshold L0 and smaller than the first load value L1, and the current rotation speed is equal to or higher than the rotation speed threshold R0 and lower than the first rotation speed R1. The operating range in these cases is the operating range indicated by backward diagonal hatching in FIG. 11C.

Figure 23:
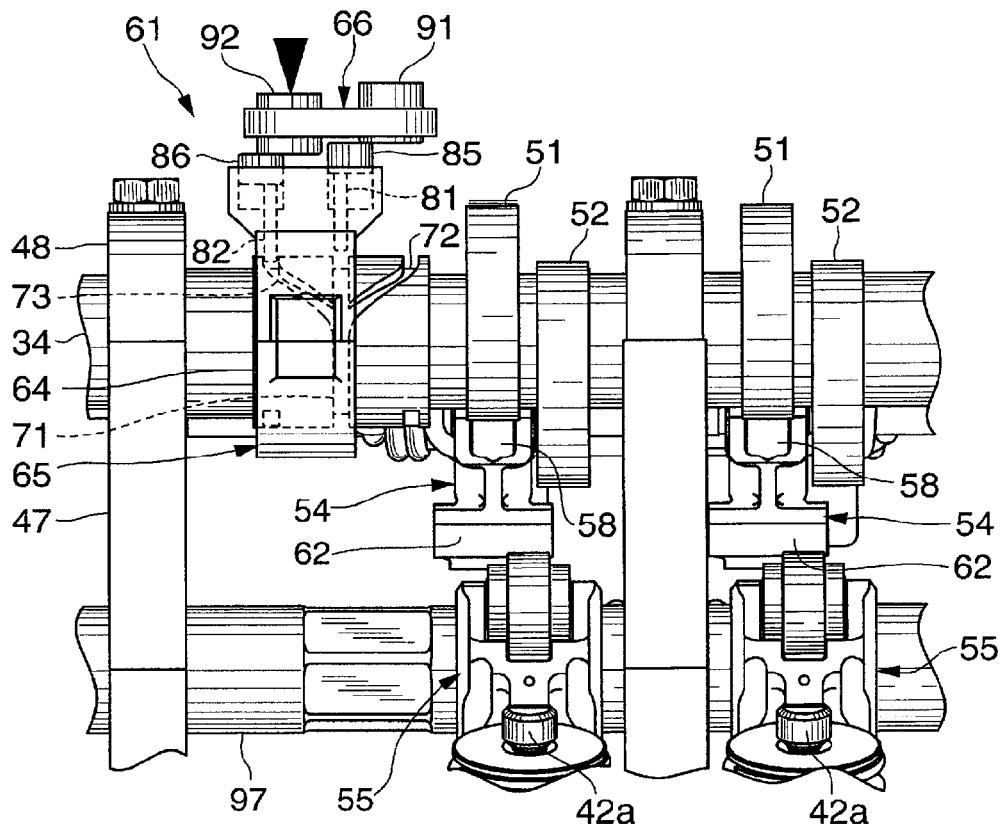
FIG. 23 is a side view for explaining the driving device when starting switching from the first execution pattern to the second execution pattern according to the second preferred embodiment of the present invention.
Figure 29:
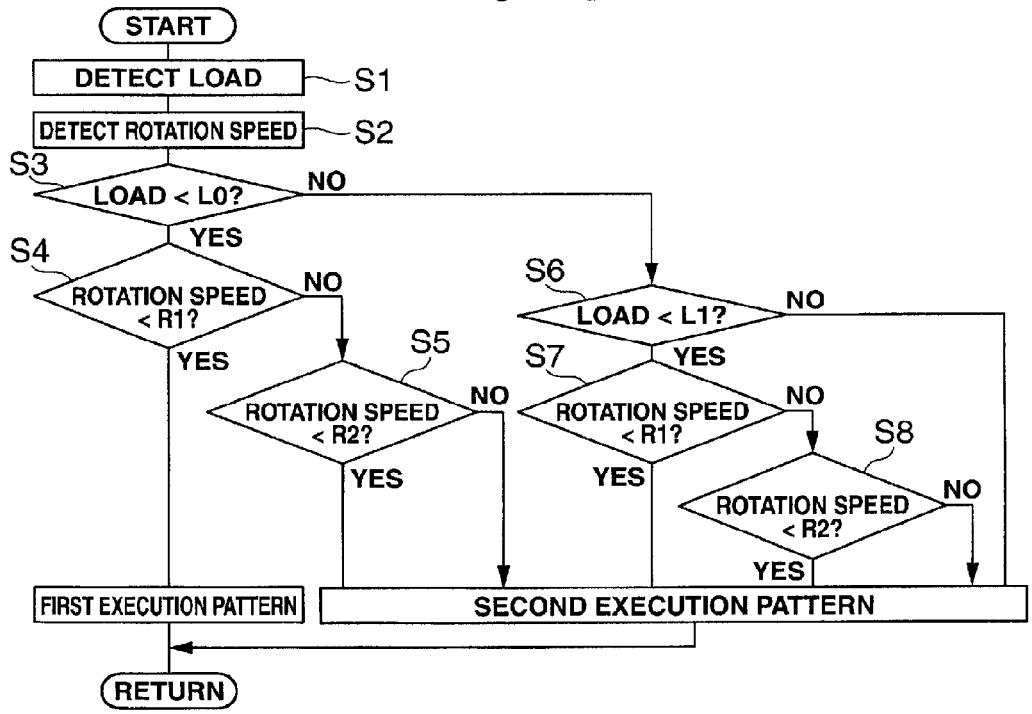
FIG. 29 is a flowchart for explaining the switching operation of the control device according to the second preferred embodiment of the present invention.

That is, when the engine operating range is the medium-load medium-rotation operating range, the execution pattern switching unit 10e ends each of steps S5 to S8 of FIG. 29 with "YES" and operates the solenoid 93 to implement the second execution pattern. The solenoid 93 moves the first plunger 91 backward and the second plunger 92 forward toward the second lifter 86, as shown in FIG. 23. At this time, the second plunger 92 presses the second pin 82 toward the large-diameter portion 64 via the second lifter 86. When the intake camshaft 34 rotates, the second pin 82 enters the linear portion 74 of the second cam groove 73. In addition, the second pin 82 is pressed against the bottom of the second cam groove 73 by the pressurizing force of the second plunger 92.

Figure 24:
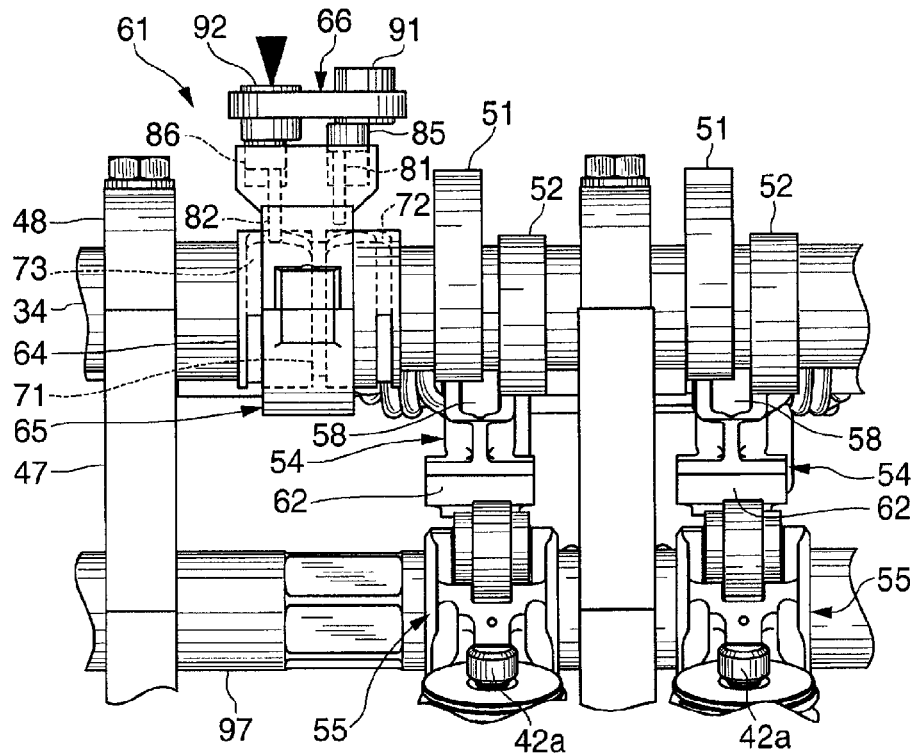
FIG. 24 is a side view for explaining the driving device during switching according to the second preferred embodiment of the present invention.

When the intake camshaft 34 further rotates, the second pin 82 moves from the linear portion 74 of the second cam groove 73 to the tilted portion 75, as shown in FIG. 24. When passing through the tilted portion 75, the second pin 82 comes into contact with the groove wall of the second cam groove 73 and is pressed by the groove wall to a side (right side in FIG. 24 or the other side in the axial direction). When the second pin 82 is pressed laterally, the slider 65 supporting it moves to the other side in the axial direction with respect to the intake camshaft 34. The slider 65 moves in the axial direction when the roller 58 of the swing cam 54 is in contact with the circular base portion 51a of the first intake cam 51.

The slider 65 is connected to the support shaft 56 so that they can integrally move in the axial direction. For this reason, the support shaft 56 moves to the other side in the axial direction together with the slider 65.

Figure 25:
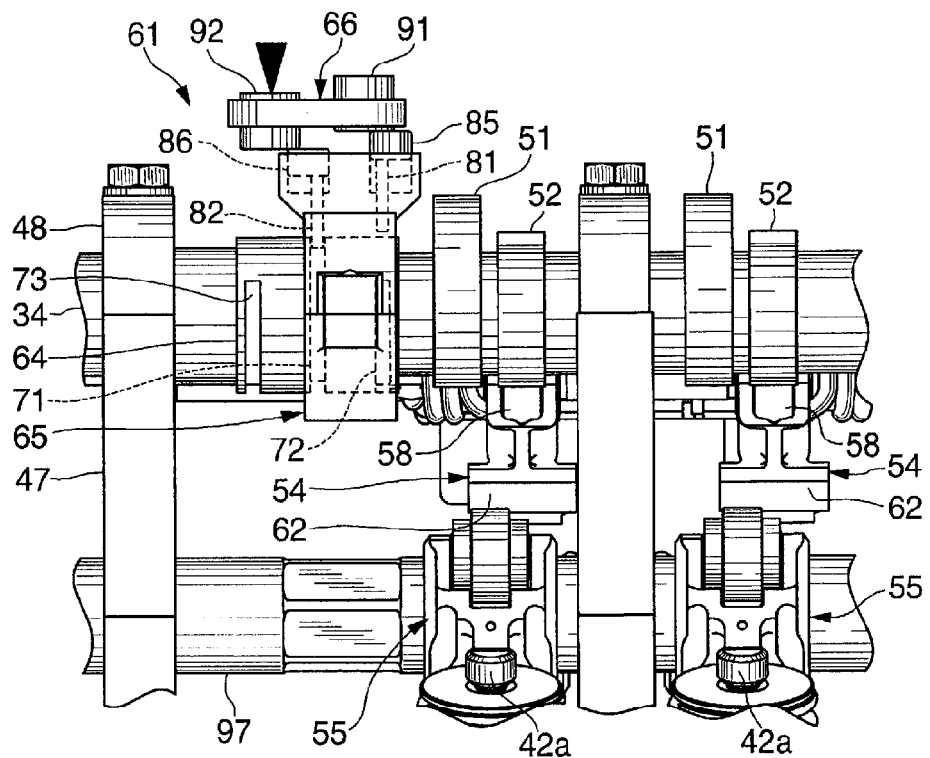
FIG. 25 is a side view for explaining the driving device after switching according to the second preferred embodiment of the present invention.

As described above, when the support shaft 56 moves to the other side in the axial direction, the pair of swing cams 54 provided for each cylinder moves in the same direction, as shown in FIG. 25. The roller 58 of each swing cam 54 comes into contact with the circular base portion 52a of the corresponding second intake cam 52. In this case, power is transmitted from the second intake cam 52 to the intake valve 7 via the swing cam 54 and the rocker arm 55. As a result, the six strokes are executed in accordance with the second execution pattern using the second intake cam 52.

Even when each of steps S3 to S8 of FIG. 29 ends with "NO", the execution pattern switching unit 10e operates the solenoid 93 to implement the second execution pattern. In this case, the current load value is equal to or larger than the first load value L1, and the current rotation speed is equal to or higher than the first rotation speed R1. The operating range in this case is the operating range indicated by forward diagonal hatching in FIG. 11C. That is, the six-stroke engine 21 according to the second preferred embodiment operates in accordance with the second execution pattern even when the operating range is the high-load high-rotation operating range.

Figure 26:
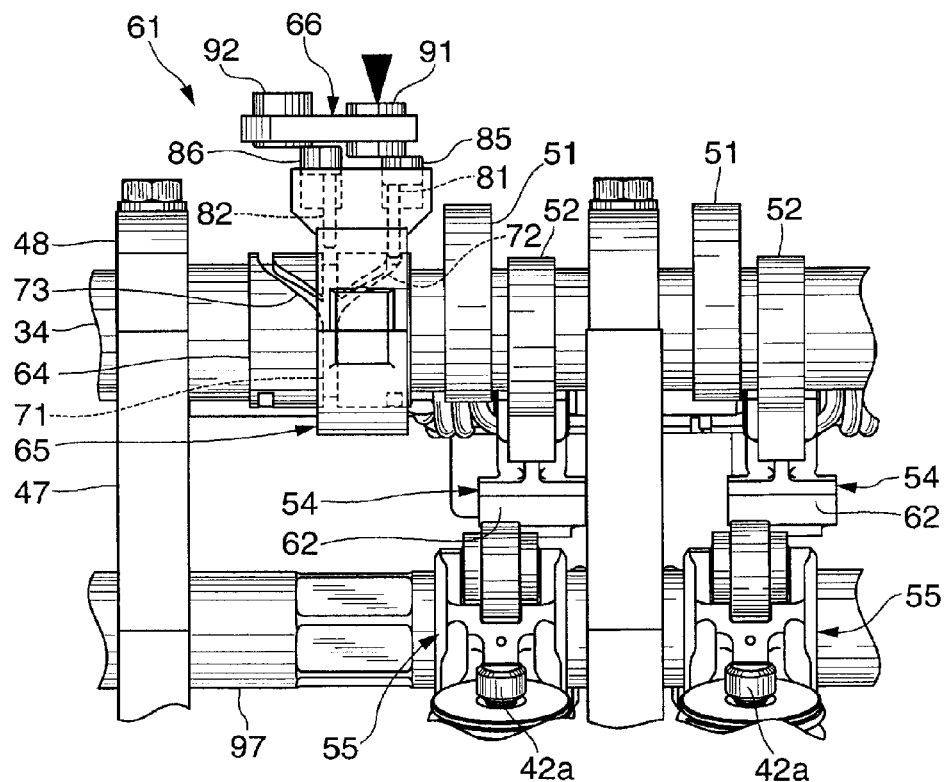
FIG. 26 is a side view for explaining the driving device when starting switching from the second execution pattern to the first execution pattern according to the second preferred embodiment of the present invention.

When the engine operating range changes from the medium-load medium-rotation operating range or high-load high-rotation operating range to the low-load low-rotation operating range including idling, the driving device 61 changes to the state shown in FIG. 26. That is, the second plunger 92 moves backward, and the first plunger 91 presses the first lifter 85. When the intake camshaft 34 rotates in this state, the slider 65, the support shaft 56, and the swing cams 54 move in the direction reverse to the above-described direction and are set in the state shown in FIG. 15. In the state shown in FIG. 15, the six-stroke engine 21 operates by executing the six strokes in accordance with the first execution pattern.

In general, the intake cam of the six-stroke engine rotates by a smaller angle during the intake stroke, as compared to the intake cam of a four-stroke engine. That is, the intake cam opens/closes the intake valve at a relatively small rotation angle. This intake cam exhibits a steep hill-shaped cam profile. For this reason, the load when this intake cam opens the intake valve is larger than the load when the intake cam of the four-stroke engine opens the intake valve.

In the six-stroke engine 21 according to the second preferred embodiment, however, the first intake cam 51 or the second intake cam 52 and the swing cam 54 convert the rotation of the intake camshaft 34 into a swing operation. In addition, the six-stroke engine 21 can relatively freely change the opening/closing timing and lift amount of the intake valve 7 by adjusting the position of the control arm 95. For this reason, the cam profile of the first intake cam 51 and the second intake cam 52 according to the second preferred embodiment has a moderate hill shape, as shown in FIG. 12. This also applies to the exhaust camshaft driving mechanism 46.

Hence, according to the present preferred embodiment, since the intake valve 7 and the exhaust valve 11 are smoothly opened/closed, it is possible to provide a six-stroke engine including a durable valve gear 14.

Figure 27:
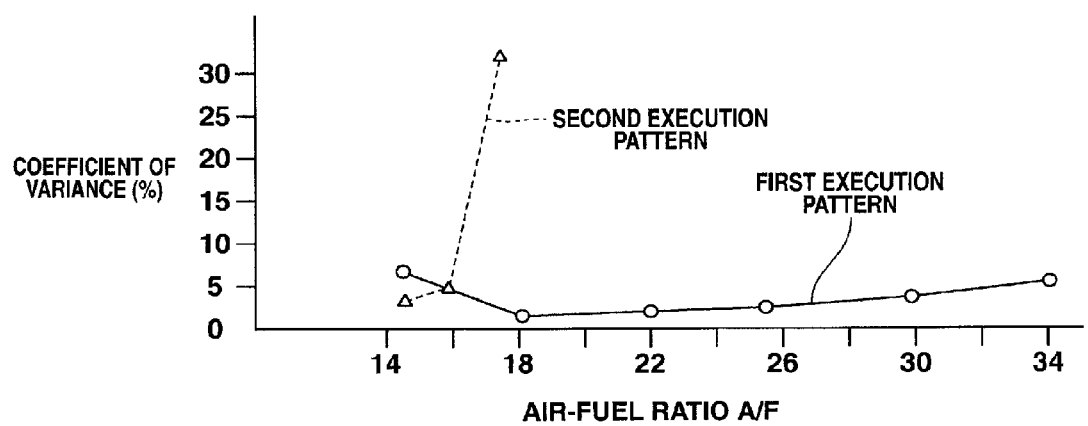
FIG. 27 is a graph showing the relationship between the air-fuel ratio and the coefficient of variance according to the second preferred embodiment of the present invention.

The six-stroke engine 21 according to the second preferred embodiment was test-manufactured, and the coefficient of variance was obtained. It was found that the combustion was stable when the engine operated in accordance with the first execution pattern. The coefficient of variance when the engine operated in accordance with the first execution pattern was almost constant without being largely affected by the air-fuel ratio, as indicated by the solid line in FIG. 27. The wavy line in FIG. 27 indicates the coefficient of variance when the engine operated in accordance with the second execution pattern.

Third Preferred Embodiment

Figure 30:
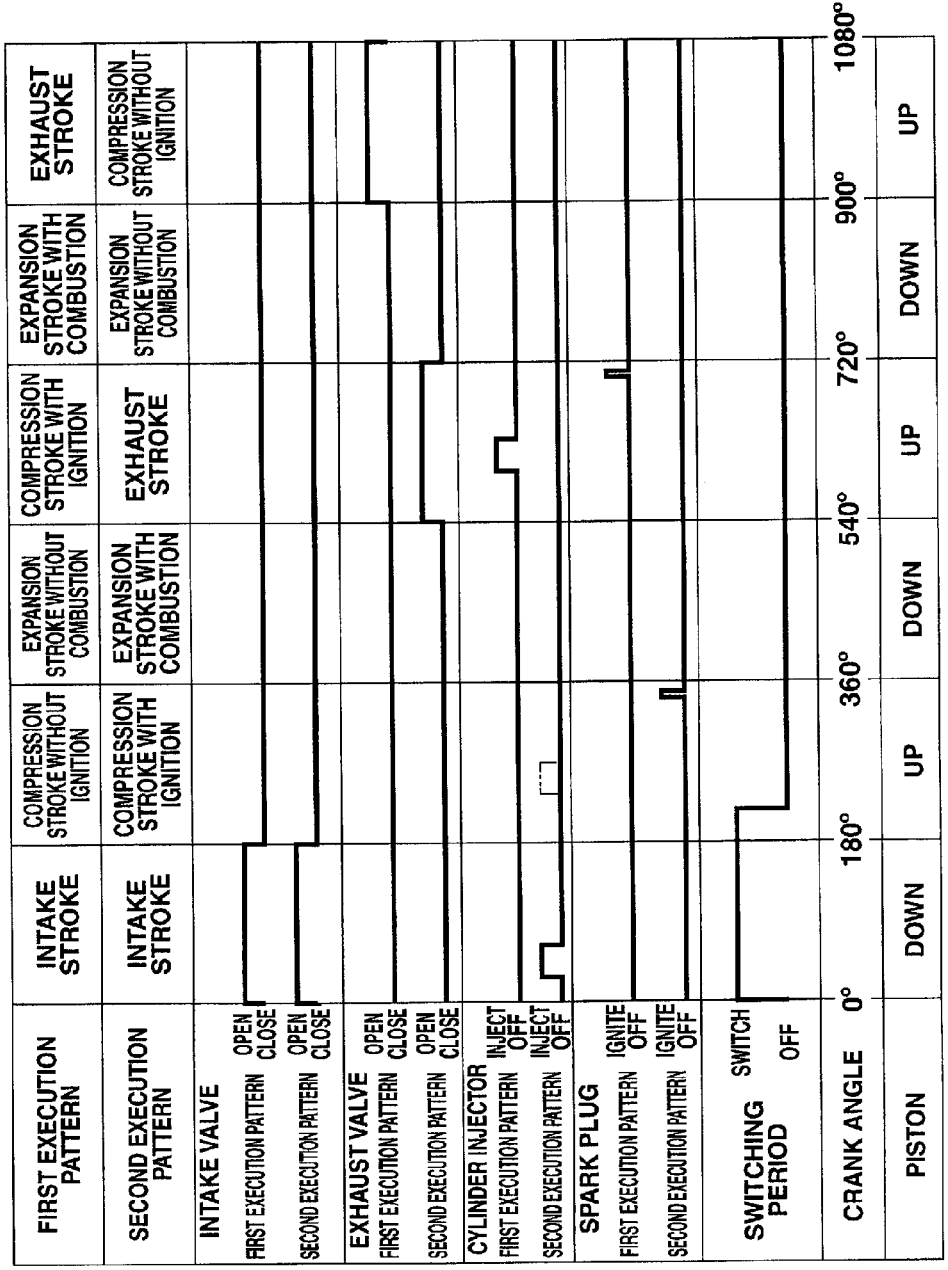
FIG. 30 is a timing chart for explaining first and second execution patterns according to a third preferred embodiment of the present invention.

In the second preferred embodiment, an example has been described in which switching between the first execution pattern and the second execution pattern preferably is done by changing the opening/closing timing of the intake valve 7. However, switching between the first execution pattern and the second execution pattern can also be done by changing the opening/closing timing of an exhaust valve 11, as shown in FIG. 30. In this case, the opening/closing timing of the intake valve 7 does not change in accordance with the pattern switching, as shown in FIG. 30. However, in this case, the ignition timing needs to be changed in accordance with the switching. The timing of switching between the first execution pattern and the second execution pattern needs to meet the following two conditions.

The first condition is the period in which the exhaust valve 11 is closed in both the first execution pattern and the second execution pattern. The second condition is the period in which the operation of the engine is not adversely affected after the switching. The period that meets these conditions is the intake stroke or the period until a cylinder injector 3 starts injecting fuel 9 in the second execution pattern, as shown in FIG. 30.

In the operation based on the second execution pattern, a homogeneous fuel-air mixture needs to be obtained. Hence, cylinder injection is performed in the first half of the intake stroke. When the cylinder injection is performed at this timing, no sufficient switching period can be obtained. In the third preferred embodiment of the present invention, a somewhat long switching period is ensured by injecting the fuel 9 in the compression stroke with ignition at the time of switching, as indicated by the alternate long and two short dashed line in FIG. 30. After the switching, the fuel 9 is injected in the first half of the intake stroke, as indicated by the solid line in FIG. 30. At any rate, the switching period is shorter than that shown in FIG. 10.

Note that even when the third preferred embodiment is used, switching between the first execution pattern and the second execution pattern can be done based on the rotation speed of the engine and the load of the engine, as shown in FIG. 11.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A six-stroke engine comprising: a cylinder; a piston inserted into the cylinder; a cylinder head attached to the cylinder; a combustion chamber surrounded by the cylinder, the piston, and the cylinder head; a cylinder injector that directly injects fuel into the combustion chamber; a spark plug attached to a wall of the combustion chamber; an intake port provided in the cylinder head and including a downstream end open to the combustion chamber; an exhaust port provided in the cylinder head and including an upstream end open to the combustion chamber; an intake valve provided in the cylinder head to open/close the intake port; an exhaust valve provided in the cylinder head to open/close the exhaust port; a valve mechanism that operates the intake valve and the exhaust valve to execute six strokes including an intake stroke, a compression stroke without ignition, an expansion stroke without combustion, a compression stroke with ignition, an expansion stroke with combustion, and an exhaust stroke in this order; and a control device programmed to cause the cylinder injector to inject the fuel and to energize the spark plug during the compression stroke with ignition.

2. The six-stroke engine according to claim 1, wherein the control device is programmed to cause the cylinder injector to inject the fuel even during a period from the intake stroke to the compression stroke with ignition.

3. The six-stroke engine according to claim 1, further comprising an intake channel injector that injects the fuel into an intake channel including the intake port.

4. The six-stroke engine according to claim 1, wherein the valve mechanism changes an execution pattern of the six strokes; the control device includes a load calculation unit that obtains a load of an engine, a rotation speed calculation unit that obtains a rotation speed of the engine, and an execution pattern switching unit programmed to cause the valve mechanism to change the execution pattern based on a magnitude of the load of the engine obtained by the load calculation unit and the rotation speed of the engine obtained by the rotation speed calculation unit; the execution pattern includes a first execution pattern applied when an operating range of the engine is in a low-load low-speed operating range, and a second execution pattern applied when the operating range of the engine is not in the low-load low-speed operating range; the low-load low-speed operating range is an operating range in which a value of the load obtained by the load calculation unit is smaller than a preset load threshold, and the rotation speed of the engine obtained by the rotation speed calculation unit is lower than a preset rotation speed threshold; the first execution pattern is a pattern in which the intake stroke, the compression stroke without ignition, the expansion stroke without combustion, the compression stroke with ignition, the expansion stroke with combustion, and the exhaust stroke are executed in this order; and the second execution pattern is a pattern in which the intake stroke, the compression stroke with ignition, the expansion stroke with combustion, the exhaust stroke, the expansion stroke without combustion, and the compression stroke without ignition are executed in this order.

5. The six-stroke engine according to claim 4, wherein the load threshold is the value of the load within the operating range of a time of starting the engine in which the load is minimized among a plurality of operating ranges as divided stepwise in accordance with the magnitude of the load of the engine; and
the rotation speed threshold is the rotation speed of the engine within the operating range of the time of starting the engine in which the rotation speed of the engine is minimized among a plurality of operating ranges as divided stepwise in accordance with the magnitude of the rotation speed of the engine.

6. The six-stroke engine according to claim 4, wherein the valve mechanism includes a camshaft on which a first intake cam corresponding to the first execution pattern and a second intake cam corresponding to the second execution pattern are provided at a predetermined interval; the six-stroke engine further comprising: a driving mechanism that transmits rotation of a crankshaft to the camshaft; and an execution pattern changing mechanism that connects one of the first intake cam and the second intake cam to the intake valve.

7. The six-stroke engine according to claim 6, wherein the execution pattern changing mechanism includes a swing cam swingably supported by a support shaft parallel or substantially parallel to the camshaft, the swing cam being movable in an axial direction between a position at which the swing cam comes into contact with the first intake cam and a position at which the swing cam comes into contact with the second intake cam;
the six-stroke engine further comprising:
a driving device that moves the swing cam to one side or another side in the axial direction under the control of the control device when both a valve lift amount of the first intake cam and that of the second intake cam are 0; and
a rocker arm swingably supported by a rocker shaft parallel or substantially parallel to the camshaft and provided between the swing cam and the intake valve; and
a contact portion between the swing cam and the rocker arm has a shape that allows the swing cam to move in the axial direction while keeping a state in which the swing cam and the rocker arm are in contact.

8. The six-stroke engine according to claim 1, further comprising:
an exhaust pipe connected to the exhaust port; and
a turbocharger provided on the exhaust pipe; wherein
the turbocharger has a variable geometry that controls a flow rate and a direction of exhaust gas to be sent to an exhaust turbine.

9. A method of operating a six-stroke engine, the six-stroke engine comprising:
a cylinder;
a piston inserted into the cylinder;
a cylinder head attached to the cylinder;
a combustion chamber surrounded by the cylinder, the piston, and the cylinder head;
a cylinder injector that directly injects fuel into the combustion chamber;
a spark plug attached to a wall of the combustion chamber;
an intake port provided in the cylinder head and including a downstream end open to the combustion chamber;
an exhaust port provided in the cylinder head and including an upstream end open to the combustion chamber;
an intake valve provided in the cylinder head to open/close the intake port; and
an exhaust valve provided in the cylinder head to open/close the exhaust port; the method comprising the steps of:
causing the engine to execute six strokes including an intake stroke, a compression stroke without ignition, an expansion stroke without combustion, a compression stroke with ignition, an expansion stroke with combustion, and an exhaust stroke in this order; and
causing the cylinder injector to inject the fuel and to energize the spark plug in the compression stroke with ignition.

10. The method of operating a six-stroke engine according to claim 9, wherein the fuel is directly injected into the combustion chamber even during a period from the intake stroke to the compression stroke with ignition.

11. The method of operating a six-stroke engine according to claim 9, wherein, when a value of a load of the engine is smaller than a preset load threshold and a rotation speed of the engine is lower than a preset rotation speed threshold, the intake stroke, the compression stroke without ignition, the expansion stroke without combustion, the compression stroke with fuel injection into the combustion chamber and ignition, the expansion stroke with combustion, and the exhaust stroke are executed in this order; and
when the value of the load of the engine is not smaller than the preset load threshold and the rotation speed of the engine is not lower than the preset rotation speed threshold, the intake stroke, the compression stroke with fuel injection into the combustion chamber and ignition, the expansion stroke with combustion, the exhaust stroke, the expansion stroke without combustion, and the compression stroke without ignition are executed in this order.

* * * * *